(12) United States Patent
Akashika

(10) Patent No.: US 11,651,338 B2
(45) Date of Patent: May 16, 2023

(54) INFORMATION ACCESS DEVICE, COMPUTER PROGRAM PRODUCT, INFORMATION PROCESSING SYSTEM, ACCESS CONTROL SYSTEM, PORTABLE TERMINAL, PORTABLE TERMINAL CONTROL METHOD, AND PORTABLE TERMINAL CONTROL PROGRAM PRODUCT

(71) Applicant: Rakuten Group, Inc., Tokyo (JP)

(72) Inventor: Hideki Akashika, Tokyo (JP)

(73) Assignee: Rakuten Group, Inc., Tokyo (JP)

( * ) Notice: Subject to any disclaimer, the term of this patent is extended or adjusted under 35 U.S.C. 154(b) by 635 days.

(21) Appl. No.: 14/655,582

(22) PCT Filed: Nov. 12, 2013

(86) PCT No.: PCT/JP2013/080594
§ 371 (c)(1),
(2) Date: Jun. 25, 2015

(87) PCT Pub. No.: WO2014/103543
PCT Pub. Date: Jul. 3, 2014

(65) Prior Publication Data
US 2016/0196541 A1    Jul. 7, 2016

(30) Foreign Application Priority Data

Dec. 28, 2012    (WO) .................. PCT/JP2012/084227

(51) Int. Cl.
*G06Q 20/10*    (2012.01)
*G06Q 20/36*    (2012.01)
(Continued)

(52) U.S. Cl.
CPC ......... *G06Q 20/108* (2013.01); *G06Q 20/325* (2013.01); *G06Q 20/327* (2013.01);
(Continued)

(58) Field of Classification Search
CPC .... G06Q 20/108; G06Q 20/32; G06Q 20/325; G06Q 20/327; G06Q 20/3278; G06Q 20/34; G06Q 20/36; H04W 4/80
(Continued)

(56) References Cited

U.S. PATENT DOCUMENTS 8,769,643 B1 * 7/2014 Ben Ayed ............. G06F 21/645
726/5
2011/0166863 A1    7/2011 Stocker et al.
(Continued)

FOREIGN PATENT DOCUMENTS

DE    102008046339 A1    3/2010
EP    1667052 A1    6/2006
(Continued)

OTHER PUBLICATIONS

Flowers (Proceedings of the IEE—Part B: Electronic and Communication Engineering, vol. 107, Issue 20S, "Transmission network planning with electronic exchanges", Nov. 1960, pp. 364-370).*
(Continued)

*Primary Examiner* — Gregory A Pollock
(74) *Attorney, Agent, or Firm* — Sughrue Mion, PLLC

(57) ABSTRACT

A system for avoiding an access conflict between a plurality of devices that access an IC module. The system includes a first device and a second device that can access an IC module used in an electronic money system. The second device has the function of detecting waves having a predetermined pattern to indicate that the first device is accessing the IC module. These waves may be continuously generated from the first device or may be continuously generated from another device installed near the first device, and when the second device detects the waves having the predetermined pattern, the second device refrains from accessing the IC module. This allows the system to implement autonomous (Continued)

US 11,651,338 B2
Page 2 conflict control between a plurality of devices that access the IC module that does not have an adequate conflict control function without providing a special control circuit.

13 Claims, 21 Drawing Sheets

(51) Int. Cl.
  *G06Q 20/32* (2012.01)
  *G06Q 20/34* (2012.01)
  *H04W 4/80* (2018.01)

(52) U.S. Cl.
  CPC ......... *G06Q 20/3278* (2013.01); *G06Q 20/34* (2013.01); *G06Q 20/36* (2013.01); *G06Q 20/326* (2020.05); *H04W 4/80* (2018.02)

(58) Field of Classification Search
  USPC .......................................................... 705/42
  See application file for complete search history.

(56) References Cited

U.S. PATENT DOCUMENTS

| | | | |
|---|---|---|---|
| 2012/0178366 A1* | 7/2012 | Levy | G06K 7/10237 455/41.1 |
| 2012/0197806 A1 | 8/2012 | Hill | |
| 2012/0252360 A1* | 10/2012 | Adams | G06Q 20/3278 455/41.1 |
| 2013/0142050 A1* | 6/2013 | Luna | H04W 24/02 370/241 |
| 2013/0171930 A1* | 7/2013 | Anand | G06Q 30/0226 455/41.1 |

FOREIGN PATENT DOCUMENTS

| | | |
|---|---|---|
| JP | 60-134956 A | 7/1985 |
| JP | 2-21353 A | 1/1990 |
| WO | 0205078 A2 | 1/2002 |

OTHER PUBLICATIONS

International Search Report for PCT/JP2012/084227 dated Feb. 12, 2013 [PCT/ISA/210].
International Search Report for PCT/JP2013/080594 dated Dec. 17, 2013 [PCT/ISA/210].
Written Submission dated Apr. 6, 2020 from the European Patent Office in application No. 13869235.5.

* cited by examiner

Fig.7(1)
USER DB

| USER ID | ELECTRONIC MONEY NUMBER | MANAGEMENT VALUE OF VALUE BALANCE | SETTING OF RECHARGING | NAME | AD-DRESS | DATE OF BIRTH | TELE-PHONE NUMBER | E-MAIL ADDRESS |
|---|---|---|---|---|---|---|---|---|
| ... | ... | ... | MADE | ... | ... | ... | ... | ... |
| ... | ... | ... | MADE | ... | ... | ... | ... | ... |
| ... | ... | ... | NOT MADE | ... | ... | ... | ... | ... |
| ... | ... | ... | NOT MADE | ... | ... | ... | ... | ... |

Fig.7(2)
RECHARGING REGISTRATION DB

| ELECTRONIC MONEY NUMBER | SETTING OF AUTOMATIC RECHARGING | CREDIT CARD NUMBER | RECHARGING AMOUNT TO BE ADDED BY ONE RECHARGING OPERATION | DAILY LIMIT OF AMOUNT | MONTHLY LIMIT OF AMOUNT | REFERENCE VALUE BALANCE |
|---|---|---|---|---|---|---|
| ... | MADE | ... | 10,000YEN | 10,000YEN | 40,000YEN | ... |
| ... | MADE | ... | NOT MADE | NOT MADE | NOT MADE | ... |
| ... | NOT MADE | ... | 5,000YEN | NOT MADE | NOT MADE | ... |

Fig.12

PRIORITIES

| PRIORITY | TYPE OF ACCESS DEVICE | TIME REQUIRED FOR ACCESSING IC MODULE |
|---|---|---|
| HIGHEST | ACCESS DEVICE INSTALLED IN PASS GATE (ENTRANCE GATE INSTALLED IN STATION) | LESS THAN OR EQUAL TO 0.1 SECOND |
| HIGH | OFFLINE PAYMENT TERMINAL (ASYNCHRONOUS PAYMENT TERMINAL) | LESS THAN OR EQUAL TO 0.1 SECOND |
| MIDDLE | ONLINE PAYMENT TERMINAL (SYNCHRONOUS PAYMENT TERMINAL, THIN CLIENT PAYMENT TERMINAL) | ABOUT 3 TO 4 SECONDS |
| LOW | ONLINE AUTOMATIC RECHARGING (ROUTE B) | ABOUT 10 TO 60 SECONDS |

Fig.15

PATTERN 1

| ASYNCHRONOUS PAYMENT TERMINAL 7 | SPEAKER 145 |
|---|---|
| CIPHER MODE | GENERATE ULTRASOUND |
| NON-CIPHER MODE | NONE |
| COMMUNICATION IS NOT PERFORMED | NONE |

PATTERN 2

| ASYNCHRONOUS PAYMENT TERMINAL 7 | SPEAKER 145 |
|---|---|
| CIPHER MODE | NONE |
| NON-CIPHER MODE | GENERATE ULTRASOUND |
| COMMUNICATION IS NOT PERFORMED | GENERATE ULTRASOUND |

PATTERN 3

| ASYNCHRONOUS PAYMENT TERMINAL 7 | SPEAKER 145 |
|---|---|
| CIPHER MODE | GENERATE ULTRASOUND OF FIRST FREQUENCY |
| NON-CIPHER MODE | GENERATE ULTRASOUND OF SECOND FREQUENCY |
| COMMUNICATION IS NOT PERFORMED | GENERATE ULTRASOUND OF SECOND FREQUENCY |

PATTERN 4

| ASYNCHRONOUS PAYMENT TERMINAL 7 | SPEAKER 145 |
|---|---|
| CIPHER MODE | GENERATE ULTRASOUND |
| NON-CIPHER MODE | GENERATE ULTRASOUND |
| COMMUNICATION IS NOT PERFORMED | GENERATE ULTRASOUND |

INFORMATION ACCESS DEVICE, COMPUTER PROGRAM PRODUCT, INFORMATION PROCESSING SYSTEM, ACCESS CONTROL SYSTEM, PORTABLE TERMINAL, PORTABLE TERMINAL CONTROL METHOD, AND PORTABLE TERMINAL CONTROL PROGRAM PRODUCT

CROSS REFERENCE TO RELATED APPLICATIONS

This application is a National Stage of International Application No. PCT/JP2013/080594, filed on Nov. 12, 2013, which claims priority from PCT Application No. PCT/JP2012/084227, filed on Dec. 28, 2012, the contents of all of which are incorporated herein by reference in their entirety.

TECHNICAL FIELD

The present invention relates to information access devices, computer program products, information processing systems, access control systems, portable terminals, portable terminal control methods, and portable terminal control program products.

BACKGROUND ART

In recent years, the use of electronic money has become widespread. In electronic money, amount information called value is related to money value and fund settlement is performed by increasing or decreasing a value balance. An IC module storing the value balance of this electronic money is incorporated into or attached to a portable terminal with a communication function.

As depicted in FIG. 21, the IC module incorporated into or attached to the portable terminal can accept accesses by a plurality of routes, that is, accepts access from an electronic money server via the communication function of the portable terminal and accept access from a reader/writer of a payment terminal by short-distance radio communication.

Here, if accesses are performed separately from different routes, no problem arises, but, if accesses are performed at the same time, control of these accesses may be needed.

For example, in FeliCa® which is widely prevalent as an IC module, as a mode used when access is performed, a non-cipher mode in which only a response is made and a cipher mode in which rewriting of data (for example, update of the value balance) is performed are provided.

In the non-cipher mode, since only a response is made to a command from the outside, even when accesses are performed from a plurality of routes at the same time, it is possible to process these accesses simultaneously. Therefore, the necessity for performing special processing does not arise.

On the other hand, in the cipher mode, access is accepted only from one route to ensure the consistency of data. It is for this reason that, in the IC module, if access is accepted from the other route while the IC module is accepting access from one route in the cipher mode, the IC module stops the previous processing in the cipher mode and starts the next processing of the access accepted after the first one.

The following is a specific example. While the IC module is performing processing in the cipher mode after being accessed by a payment terminal by short-distance radio communication, if the IC module receives, from an electronic money application, a command (polling) for capturing a card, the IC module returns a response to this polling, and the processing between the IC module and the payment terminal in the cipher mode is stopped (which is recognized as an error on the payment terminal side). Then, when the payment terminal makes a retry of a series of processing from polling again, the processing demanded by the electronic money application is stopped.

A repetition of this processing may cause an endless loop.

Incidentally, in the past, in an information processing system provided with a storage device on which data writing and reading operations are performed in response to memory access requests that are issued independently from a plurality of information processing devices, a system performing exclusive control that makes one information processing device have the exclusive right to access memory and suppresses access requests from the other information processing device in the meantime has been known (refer to, for example, Patent Document 1).

CITATION LIST

Patent Literature

Patent Document 1: JP-A-60-134956

DISCLOSURE OF INVENTION

Problem to be Solved by the Invention

However, the IC module used in the electronic money system is incorporated into or attached to a portable terminal owned by the user, and it is extremely difficult to add a control function ex-post facto.

A challenge addressed by the present invention is to avoid an access conflict between a plurality of devices that access an information resource.

SUMMARY OF THE INVENTION

The invention provides an information access device for accessing a storage device from and into which information can be read and written by access from an outside, the information access device comprising: a sensing unit that senses an access status to the storage device from another information access device; a determining unit that determines, in accordance with the access status, whether or not to start the access if the access to the storage device has not yet been started or whether or not to continue the access after the access to the storage device is started; and a performing unit that starts, continues, or stops the access to the storage device in accordance with a determination result of the determining unit.

The invention provides the information access device, wherein the sensing unit includes a sensor unit and is configured so as to sense the access status by sensing a signal that is generated at a time of access to the storage device from the another information access device.

The invention provides the information access device, wherein the sensor unit includes a microphone and is configured so as to sense the access status by sensing sound that is generated at a time of access to the storage device from the another information access device.

The invention provides a computer program product that makes an information access device implement a function for accessing a storage device from and into which information can be read and written by access from an outside, the computer program product making the information access device implement: a function of sensing an access status to the storage device from the another information access device; a function of determining, in accordance with the access status, whether or not to start the access if the access to the storage device has not yet been started or whether or not to continue the access after the access to the storage device is started; and a function of starting, continuing, or stopping the access to the storage device in accordance with a determination result.

The invention provides an information processing system including a storage device from and into which information can be read and written by access from an outside and first and second information access devices for accessing the storage device, wherein the first information access device includes a notifying unit for notifying an access status to the storage device, and the second information access device includes a determining unit that determines, in accordance with a presence or absence of notification by the notifying unit or a content thereof, whether or not to start the access if the access to the storage device has not yet been started or whether or not to continue the access after the access to the storage device is started, and a performing unit that starts, continues, or stops the access to the storage device in accordance with a determination result of the determining unit.

The invention provides an information access device that is used in the information processing system, the information access device comprising: a notifying unit for notifying an access status to the storage device, wherein the notifying unit includes a signal generation device that generates a signal indicating that the storage device is being accessed or the storage device is not accessed and can transmit the signal to an outside.

The invention provides the information access device, wherein the signal that is generated by the notifying unit is a signal formed of sound.

The invention provides an access control system comprising: a first device that can access an information resource; a wave generator that is installed in connection with the first device and continuously generates waves having a predetermined pattern in such a way that the waves are detected directly by a second device; and the second device that refrains from accessing the information resource while the waves having the predetermined pattern are detected by a detecting unit, wherein the information resource is an IC module that includes a storing unit that stores a balance of electronic value and a changing unit that changes the balance stored in the storing unit by using balance change information, the first device is an access terminal provided with a transmitting unit that transmits balance change information generated by a generating unit to the IC module, and the second device includes a transferring unit that transfers balance change information received from an electronic money server to the IC module and a control unit that performs control in such a way as to refrain from accessing the IC module while the waves having the predetermined pattern are detected by the detecting unit.

The invention provides the access control system, wherein the wave generator continuously generates waves having a pattern in accordance with priority of access to the IC module, and when an objective is to perform processing with lower priority than priority indicated by a pattern of waves detected by the detecting unit, the control unit performs control in such a way as to refrain from accessing the IC module.

The invention provides the access control system, wherein the priority is set such that higher priority is given to processing with a shorter time required for access to the IC module.

The invention provides the access control system, wherein the priority is set such that the highest priority is given to an access terminal that is installed in connection with a pass gate.

The invention provides the access control system, wherein the control unit performs control such that the waves are detected by the detecting unit in a period between a reception of the balance change information from the electronic money server and a transfer thereof to the IC module and performs control so as to refrain from transferring the balance change information when the waves are detected by the detecting unit during the period.

The invention provides the access control system, wherein the detecting unit continuously detects the waves, and after detection of the waves having the predetermined pattern by the detecting unit is stopped, the control unit performs control so as to perform the postponed access to the IC module.

The invention provides the access control system, wherein the IC module further includes a unit that outputs a signal indicating whether or not the IC module is in a state in which the IC module is being accessed from an outside, and the control unit performs control so as to perform the postponed access to the IC module after confirming that the signal indicating that no access is being performed from the outside is output from the IC module.

The invention provides the access control system, wherein the control unit turns on the detecting unit before access to the IC module is started.

The invention provides the access control system, wherein the control unit turns off the detecting unit after a need for refraining from accessing the IC module is eliminated.

The invention provides the access control system, wherein the waves are ultrasound, the wave generator is a sound outputting unit, the detecting unit includes a sound inputting unit, and the access terminal further includes a unit that controls the sound outputting unit such that the ultrasound is output only when the IC module is being accessed.

The invention provides a portable terminal comprising: a transferring unit that transfers balance change information received from an electronic money server to an IC module including a storing unit that stores a balance of electronic value and a changing unit that changes the balance stored in the storing unit by using balance change information; and a control unit that performs control such that the balance change information is not transferred to the IC module while ultrasound having a predetermined pattern is detected by a sound inputting unit, the ultrasound having the predetermined pattern that is output from an access terminal including a transmitting unit that transmits balance change information generated by a generating unit to the IC module and a unit that controls a sound outputting unit such that the ultrasound having the predetermined pattern is output while the IC module is being accessed.

The invention provides a portable terminal control method comprising: a transferring step of transferring balance change information received from an electronic money server to an IC module including a storing unit that stores a balance of electronic value and a changing unit that changes the balance stored in the storing unit by using balance change information; and a control step of performing control such that the balance change information is not transferred to the IC module while ultrasound having a predetermined pattern is detected by a sound inputting unit, the ultrasound having the predetermined pattern that is output from an access terminal including a transmitting unit that transmits balance change information generated by a generating unit to the IC module and a unit that controls a sound outputting unit such that the ultrasound having the predetermined pattern is output while the IC module is being accessed.

The invention provides a portable terminal control program product that makes a computer forming a portable terminal implement: a transferring function of transferring balance change information received from an electronic money server to an IC module including a storing unit that stores a balance of electronic value and a changing unit that changes the balance stored in the storing unit by using balance change information; and a control function of performing control such that the balance change information is not transferred to the IC module while ultrasound having a predetermined pattern is detected by a sound inputting unit, the ultrasound having the predetermined pattern that is output from an access terminal including a transmitting unit that transmits balance change information generated by a generating unit to the IC module and a unit that controls a sound outputting unit such that the ultrasound having the predetermined pattern is output while the IC module is being accessed.

Effect of the Invention

According to the present invention, in a system in which a plurality of information processing devices can access one information resource, when the other information processing device detects that one information processing device is accessing the information resource or is at the stage prior to access, the other information processing device refrains from accessing the information resource, whereby an access conflict is avoided.

BRIEF DESCRIPTION OF DRAWINGS

FIG. 7 is a diagram for explaining a user DB and a recharging registration DB of the electronic money server;

FIG. 12 is a diagram for explaining the priorities in this embodiment;

FIG. 15 is a diagram for explaining the relationship between each processing state of an asynchronous payment terminal and the ultrasound generation status of a speaker that generates ultrasound in a third embodiment and a fourth embodiment;

DESCRIPTION OF EMBODIMENTS (A) Outline of an Embodiment

Figure 2:
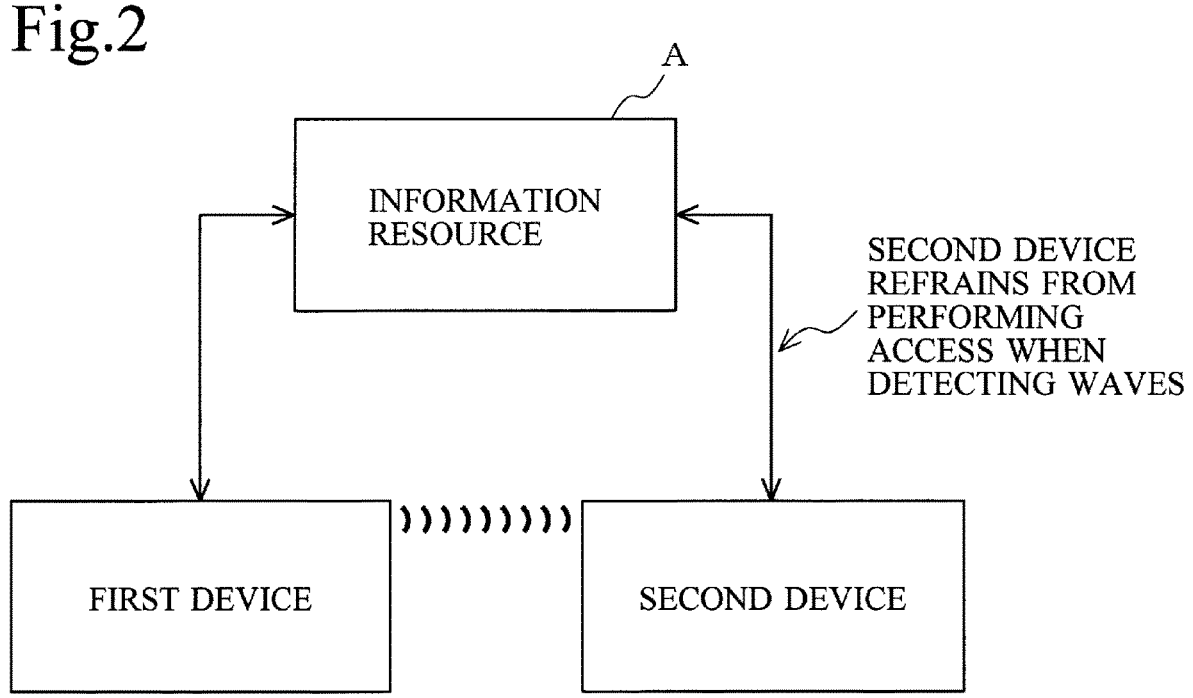
FIG. 2 is a diagram for explaining the configuration of this embodiment.

As depicted in FIG. 2, a first device (for example, a payment terminal installed in a store, an entrance gate installed in a ticket wicket of a station) and a second device (for example, a portable terminal) can access an information resource A (for example, an IC module used in an electronic money system). In addition, this information resource A does not have an adequate conflict control function for accesses from both devices, and there is a possibility that a trouble will arise if both devices access the information resource A at the same time. Moreover, the second device has the function of receiving (detecting) waves having a predetermined pattern. Here, the waves having a predetermined pattern are sound waves (for example, ultrasound), electromagnetic waves (for example, lightwaves, infrared radiation, radio waves), and so forth.

When the second device detects the waves having a predetermined pattern, the second device refrains from accessing the information resource A. The predetermined waves may be continuously generated from the first device or may be continuously generated from another device (for example, a device installed near the first device).

It is possible to implement autonomous conflict control between a plurality of devices that access the information resource A that does not have an adequate conflict control function without providing a special control circuit or the like.

(2) Details of the Embodiment

Figure 1:
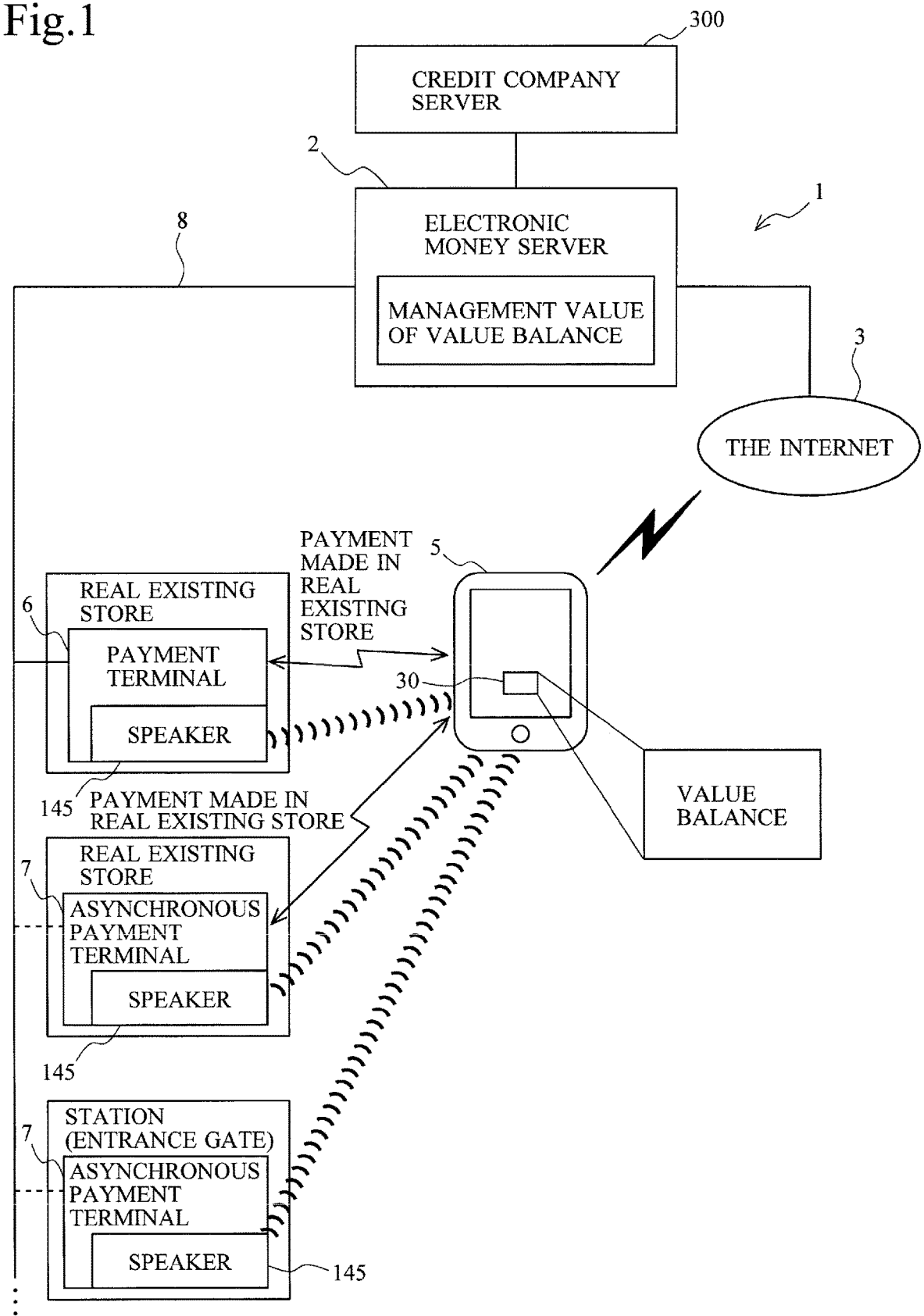
FIG. 1 is a diagram for explaining the network configuration of an electronic money system according to an embodiment.

FIG. 1 is a diagram for explaining the network configuration of an electronic money system 1 according to a first embodiment.

The electronic money system 1 is formed by using an electronic money server 2, the Internet 3, a portable terminal 5, a payment terminal 6, asynchronous payment terminals 7 (an asynchronous payment terminal 7 installed in a real existing store, an entrance gate of a station), a communication line 8, a credit company server 300, and so forth.

The electronic money server 2 is a server that manages the transfer of money value by value. Here, value is electronic information related to money value, and the electronic money system 1 transfers the money value by increasing or decreasing the balance of value (hereinafter, a value balance).

Then, a business entity of the electronic money system 1 brings the transfer of value into correspondence with the transfer of actual money by transferring the actual money in response to the transfer of value.

The electronic money server 2 stores a management value of a value balance in a state in which the value is related to the portable terminal 5 for management. As will be described later, the portable terminal 5 stores a value balance in an IC module 30 incorporated into or attached to the portable terminal 5.

It is preferable that they are always in synchronism with each other and have the same value. However, in actuality, there are many asynchronous payment terminals 7 that cannot connect to the electronic money server 2 in real time. Therefore, generated log data is sent to the electronic money server 2 later by batch processing to make them in synchronism with each other ex-post facto.

In this embodiment, a stored value type electronic money system that manages value on the portable terminal 5 (electronic money card) side will be described. Instead, server type electronic money that manages value on the electronic money server 2 side may be adopted. This case is predicated on the use of the payment terminal 6 as the payment terminal.

The portable terminal 5 is a portable terminal formed as a smartphone, a mobile telephone, a game console, a tablet computer, or the like and has the function of connecting to the Internet 3 and the function of connecting to the payment terminal 6 or the asynchronous payment terminal 7 by short-distance radio communication.

The portable terminal 5 has the IC module 30 incorporated thereinto or attached thereto and stores an electronic money number and a value balance in the IC module 30.

The payment terminal 6 performs short-distance radio communication with the portable terminal 5 and performs communication also with the electronic money server 2 via the communication line 8, thereby transmitting information such as a payment amount to the electronic money server 2 and relaying the communication between the electronic money server 2 and the portable terminal 5. The payment terminal 6 is a synchronous payment terminal that performs online communication with the electronic money server 2 in real time at the time of payment using the portable terminal 5.

The payment terminal 6 is installed in an accounting counter, an automatic vending machine, or the like of a real existing store (a real existing store that is physically open in a real existing store or the like) such as a convenience store.

The communication line 8 is a line that connects the electronic money server 2 with the payment terminal 6 or the asynchronous payment terminal 7. As the communication line 8, a dedicated line can be used, and a general-purpose line such as the Internet 3 may also be used.

The asynchronous payment terminal 7 is installed in, for example, entrance gates of a station and a stadium, a store and an automatic vending machine with insufficient network equipment, and so forth, and has the function of performing short-distance radio communication with the portable terminal 5.

The asynchronous payment terminal 7 performs short-distance radio communication with the portable terminal 5 and makes payment by a value balance. The asynchronous payment terminal 7 is usually not connected to the electronic money server 2 (therefore cannot make payment by server type electronic money) and temporarily stores the details of payment performed between the asynchronous payment terminal 7 and the portable terminal 5 as log data.

Then, the asynchronous payment terminal 7 connects to the electronic money server 2 around once a day, for example, by using the communication line 8 and transmits the log data to the electronic money server 2. In an environment with no network communication equipment, a person in charge sometimes manually collects a recording medium on which the log data is recorded.

As for the value balance, the electronic money server 2 manages the fund transfer based on the log data in the payment terminal 6 and the asynchronous payment terminal 7.

Incidentally, the electronic money number is also used as an ID to manage comings and goings of residents in an apartment and employees of a company, for example. In this case, an electronic money number of a resident or an employee is registered in the asynchronous payment terminal 7 and, if the acquired electronic money number is registered therein, a gate (a door) is opened. On the other hand, if the acquired electronic money number is not registered therein, the gate (the door) is closed to refuse the entry of an unrelated person.

The payment terminal 6 and the asynchronous payment terminal 7 each have a speaker 145 and make the speaker 145 generate ultrasound.

The credit company server 300 is a server used by a credit company to manage payment by credit card. When the electronic money server 2 recharges the IC module 30, the credit company server 300 makes payment for recharging by using a credit number of the user.

Figure 3:
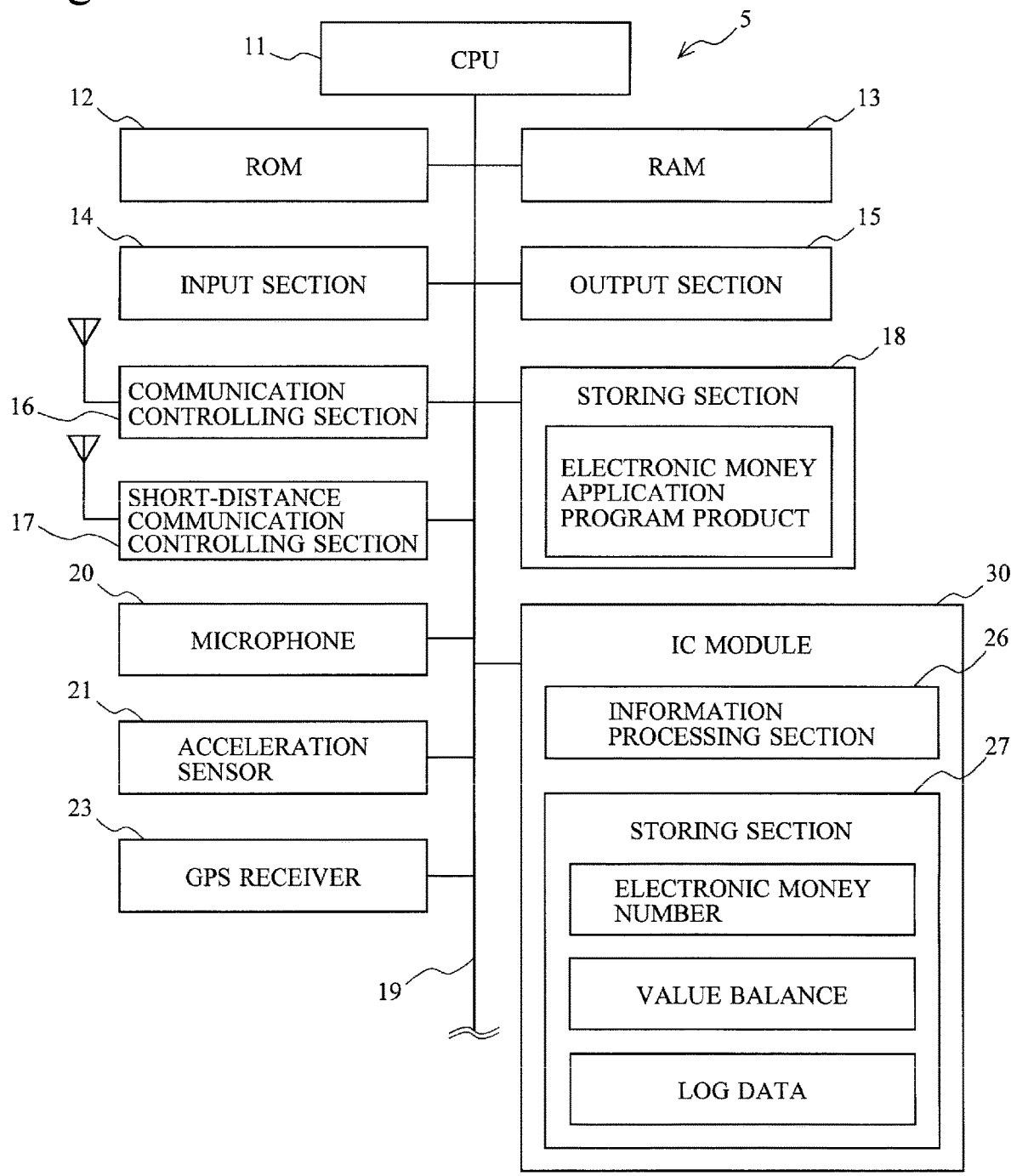
FIG. 3 is a diagram for explaining the configuration of a portable terminal.

FIG. 3 is a diagram depicting the hardware configuration of the portable terminal 5. Here, as an example, it is assumed that the portable terminal 5 is a smartphone, but the same goes for a mobile telephone.

A game console and a tablet computer usually do not have the function of performing radio communication with a base station antenna of the mobile telephone network and often only have the function of performing radio communication with an access point of a wireless LAN. Incidentally, some models of smartphones also have the function of performing radio communication with the access point of the wireless LAN.

The portable terminal 5 is formed of a CPU (Central Processing Unit) 11, ROM (Read Only Memory) 12, RAM (Random Access Memory) 13, an input section 14, an output section 15, a communication controlling section 16, a short-distance communication controlling section 17, a storing section 18, a microphone 20, an acceleration sensor 21, the IC module 30, and so forth which are connected to one another via a bus line 19.

The CPU 11 performs various kinds of information processing and overall control of the portable terminal 5 by executing a program product recorded on the ROM 12 and the storing section 18. In this embodiment, for example, the CPU 11 supports payment processing by a value balance by operating in cooperation with the electronic money server 2 by a function offered by an electronic money application program product which will be described later.

The ROM 12 is read-only memory, and a basic program product used by the portable terminal 5 to operate, a parameter, data, and so forth are recorded thereon.

The RAM 13 is readable/writable memory and offers working memory used when the CPU 11 performs information processing.

The output section 15 is a functional section that outputs information to the user and is provided with, for example, a liquid crystal display for screen display, a speaker from which sound is output, and so forth. On the liquid crystal display, for example, an icon for starting the electronic money application program product is displayed.

The input section 14 is a functional section that inputs information from the outside and is provided with, for example, a touch panel installed on the liquid crystal display and so forth. The user can enter information by touching the touch panel in response to the display on the liquid crystal display.

The storing section 18 is formed by using, for example, a recording medium such as an EEPROM (Electrically Erasable and Programmable ROM) and a hard disk, and an OS (Operating System) which is a basic program product that controls the portable terminal 5, the electronic money application program product that supports payment by value, and other program products and data are recorded thereon.

The communication controlling section 16 includes an antenna for performing radio communication with the base station antenna of the mobile telephone network and connects the portable terminal 5 to the Internet 3 or a telephone line. The portable terminal 5 can perform communication with the electronic money server 2 through the communication controlling section 16 via the Internet 3.

Moreover, the smartphone also has the function of performing radio communication with the access point of the wireless LAN.

The short-distance communication controlling section 17 includes an antenna for performing short-distance radio communication with a reader/writer of the payment terminal 6 or the asynchronous payment terminal 7 and connects the IC module 30 to the payment terminal 6 or the asynchronous payment terminal 7. In addition to performing communication with the payment terminal 6 and the asynchronous payment terminal 7 via the short-distance communication controlling section 17, the IC module 30 can perform communication with the electronic money server 2 via the portable terminal 5.

The IC module 30 is an IC module in which a general-purpose application is stored and is incorporated into or attached to the portable terminal 5. The user can download an application and stores the application in the IC module 30.

The IC module 30 is formed of a CPU, RAM, ROM, and so forth and includes an information processing section 26 that performs information processing in accordance with various program products and a storing section 27 formed of nonvolatile memory.

In the storing section 27, an electronic money number, a value balance, though not depicted in the drawing, a value operation program product for operating the value balance by the information processing section 26, authentication data by which the electronic money server 2 authenticates the IC module 30, and so forth are stored.

The electronic money number is a number used by the electronic money server 2 to identify the user of the portable terminal 5 (the IC module 30).

Reduction processing and increase processing related to the value balance in the IC module 30 are performed by the value operation program product formed in the information processing section 26 in the IC module 30 in accordance with an instruction from the outside in order to increase security by limiting the value balance processing to the inside of the IC module 30.

Incidentally, as for the value balance processing, information to be input to the IC module 30 is encrypted and is decoded in the IC module 30, and the information to be output from the IC module 30 is output after being encrypted in these chips.

The microphone 20 receives sound from the outside and converts the sound into an electrical signal. The microphone 20 can receive not only normal sound in the audible range but also ultrasound. Since the ultrasound is a sound wave in the non-audible range and has high rate of attenuation, it is desirable to use the microphone 20 of high precision. The microphone 20 can be turned on and off by an electronic money application 29.

The acceleration sensor 21 is an inertial sensor for measuring acceleration. By measuring acceleration and performing signal processing, it is possible to obtain various information such as the inclination, movement, vibration of the portable terminal 5 and an impact on the portable terminal 5.

A GPS receiver 23 can measure the current position of the portable terminal 5 by receiving the radio waves from a plurality of GPS satellites and calculating the distance from each GPS satellite.

Figure 4:
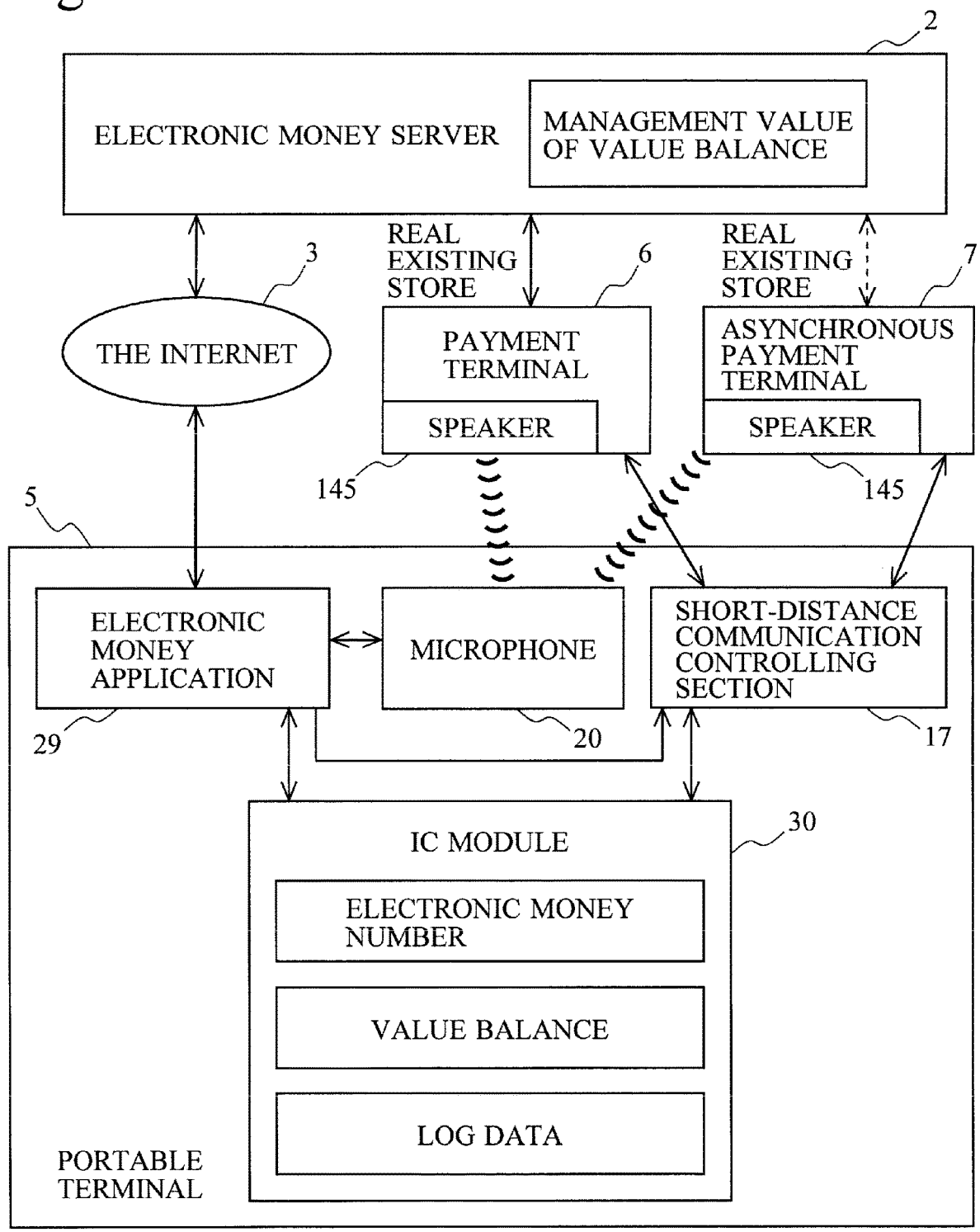
FIG. 4 is a diagram for explaining the function of the portable terminal.

FIG. 4 is a diagram for explaining the function of the portable terminal 5.

When the electronic money application program product is executed, the electronic money application 29 is formed in the portable terminal 5.

In the case of payment in the real existing store provided with the payment terminal 6, the short-distance communication controlling section 17 performs communication with the payment terminal 6 and performs communication with the electronic money server 2 via the payment terminal 6.

In the case of payment in the real existing store provided with the asynchronous payment terminal 7, the short-distance communication controlling section 17 performs communication with the asynchronous payment terminal 7.

Moreover, the electronic money application 29 can access the IC module 30.

In the case of payment in the real existing store, the short-distance communication controlling section 17 can increase or decrease the value balance and read the electronic money number by making the value operation program product operate in the IC module 30.

Then, when payment processing is performed, the IC module 30 updates (reduces) the terminal-side value balance by receiving a request to update (reduce) the value balance from the asynchronous payment terminal 7 via the short-distance communication controlling section 17.

As the value balance update processing that is performed here, the following methods are possible.

(Method 1) A Case where an Overwriting Instruction is Sent as a Value Balance Update Request.

In this case, the electronic money server 2 subtracts a payment amount from the value balance received from the CPU of the IC module 30 of the portable terminal 5 and calculates the balance after subtraction. Then, the asynchronous payment terminal 7 sends, as a value balance update request, an overwriting instruction by which overwriting is performed on the balance after calculation. The CPU of the IC module 30 of the portable terminal 5 performs update by performing overwriting with the value balance in accordance with the overwriting instruction.

(Method 2) A Case where a Subtraction Instruction is Sent as a Value Balance Update Request.

In this case, the asynchronous payment terminal 7 sends, as a value balance update request, a subtraction instruction by which subtraction is performed on the value balance by a payment amount to the CPU of the IC module 30 of the portable terminal 5. The CPU of the IC module 30 of the portable terminal 5 updates the value balance by subtracting the payment amount from the value balance in accordance with the instruction.

Then, the IC module 30 notifies the asynchronous payment terminal 7 of the update of the value balance.

Next, recharging in the real existing store will be described.

This recharging is performed on the premise that a clerk who operates the asynchronous payment terminal 7 has received the money corresponding to the value by which recharging is performed. Then, when recharging processing is performed, the IC module 30 updates (increases) the value balance by receiving a request to update (increase) the value balance from the asynchronous payment terminal 7 via the short-distance communication controlling section 17.

Then, the IC module 30 notifies the asynchronous payment terminal 7 of the update of the value balance.

In this recharging, it is also possible to perform recharging directly from the electronic money server 2 without the asynchronous payment terminal 7. In this case, the electronic money server 2 is accessed via the communication controlling section 16 of the portable terminal 5, and procedures such as user authentication processing and permission from a certification organization server such as the credit company server 300 are performed. Then, the portable terminal 5 receives amount change (increase) information from the electronic money server 2, and the IC module 30 updates (increases) the value balance.

This recharging from the electronic money server 2 is performed as a series of processing. Therefore, it is impossible to complete the processing instantaneously, and it takes a certain amount of time to complete the processing.

Making settings so that this recharging from the electronic money server 2 is performed automatically under a certain condition (for example, when the value balance becomes a certain value or less) is referred to as automatic recharging. By setting this automatic recharging, it is possible to prevent a situation in which payment cannot be made due to insufficient value at the time of payment when payment is needed.

The automatic recharging procedure will be described later.

Figure 5:
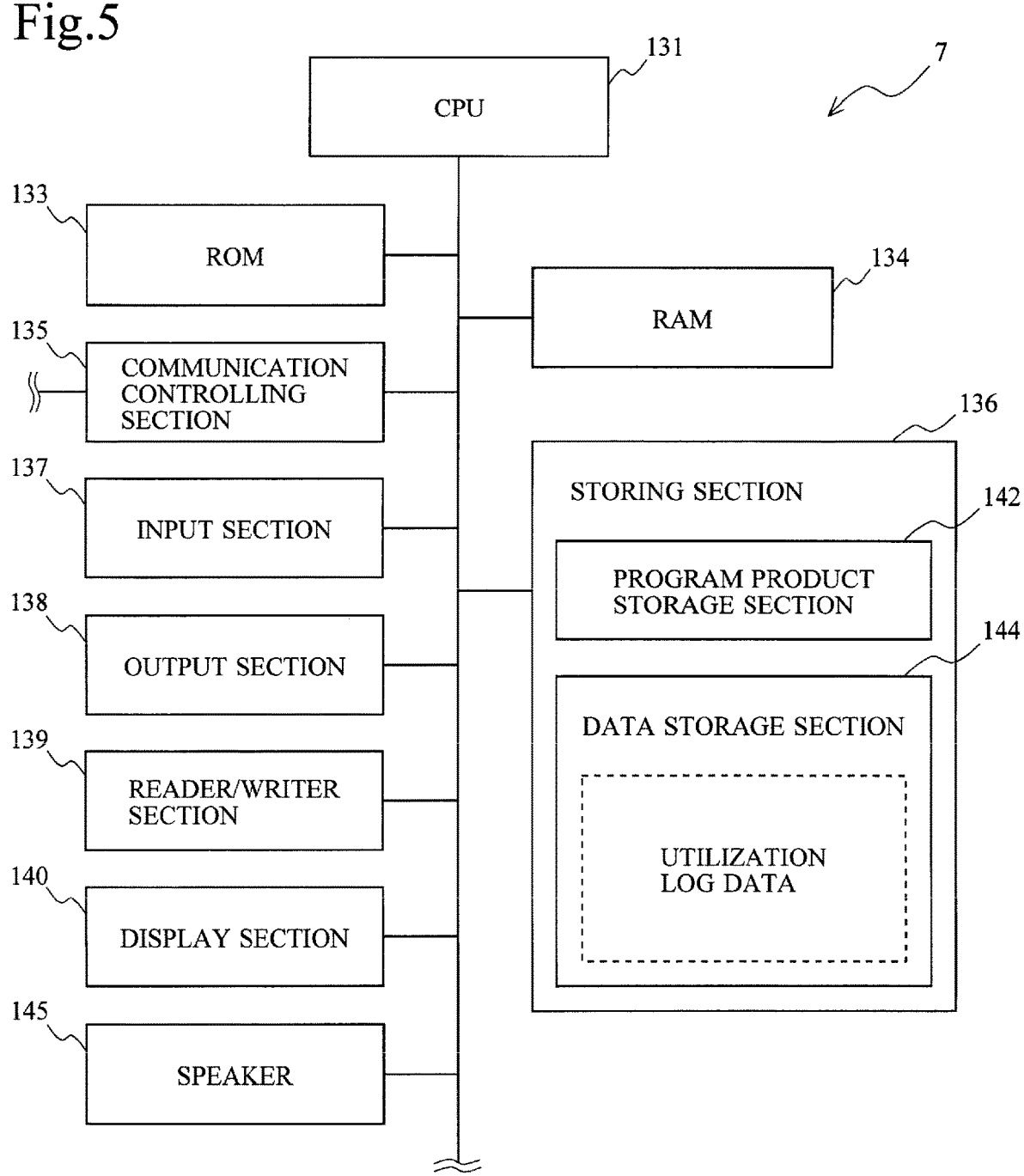
FIG. 5 is a diagram for explaining the configuration of an asynchronous payment terminal.

FIG. 5 is a diagram depicting an example of the hardware configuration of the asynchronous payment terminal 7.

The asynchronous payment terminal 7 is formed of a CPU 131, ROM 133, RAM 134, a communication controlling section 135, a storing section 136, an input section 137, an output section 138, a reader/writer section 139, a display section 140, the speaker 145, and so forth which are connected to one another via a bus line and has the function as a payment processing device.

In addition to performing information processing in accordance with a predetermined program product, the CPU 131 performs overall control of the asynchronous payment terminal 7. In this embodiment, the CPU 131 transmits amount change information to the IC module 30 of the portable terminal 5 to make the IC module 30 perform amount change processing.

The ROM 133 is read-only memory storing a basic program product for making the asynchronous payment terminal 7 operate, a parameter, and so forth.

The RAM 134 is memory on which writing and reading can be performed at any time, the memory that offers working memory of the CPU 131 and loads the program product and the data stored in the storing section 136 and stores the program product and the data.

The communication controlling section 135 is a connection device that connects the asynchronous payment terminal 7 to the electronic money server 2 via a network.

When the asynchronous payment terminal 7 is the asynchronous payment terminal 7 installed in a store, the input section 137 is provided with an input device such as a keyboard and a bar code reader, for example, so that an operator can enter a product code, a payment amount, a recharging amount, and so forth.

Moreover, when the asynchronous payment terminal 7 is the asynchronous payment terminal 7 installed in an entrance gate installed in a station or the like, the input section 137 is connected to a control device of the entrance gate, for example, and accepts the input of the payment amount from the control device of the entrance gate.

When the asynchronous payment terminal 7 is the asynchronous payment terminal 7 installed in a store, the output section 138 is connected to, for example, the display section 190 of a liquid crystal display device, a printer, the speaker 145 that outputs sound, and so forth and presents information to a customer or an operator of a member store.

Moreover, when the asynchronous payment terminal 7 is the asynchronous payment terminal 7 installed in an entrance gate, for example, the output section 138 is connected to a drive unit that drives a gate door and a warning lamp, a sound output device, and so forth which are installed in the entrance gate, and opens and closes the gate door and makes the warning lamp flash and produces a warning tone in synchronism with the opening and closing of the gate door.

The reader/writer section 139 has a built-in antenna and performs radio communication with the IC module 30 incorporated into or attached to the portable terminal 5.

When the asynchronous payment terminal 7 is the asynchronous payment terminal 7 installed in a store, the reader/writer section 139 is installed near a cash register so that the user can bring the portable terminal 5 or the electronic money card closer to the reader/writer section 139 when paying for a product.

Moreover, when the asynchronous payment terminal 7 is the asynchronous payment terminal 7 installed in an entrance gate, the reader/writer section 139 is installed on the top face of the entrance gate in a position closer to the front than a gate door so that the user can bring the portable terminal 5 or the electronic money card closer to the reader/writer section 139 when passing through a pass gate.

The storing section 136 is formed of, for example, a hard disk or other storage media and a drive unit that drives them, and is formed of a program product storage section 142 that stores various program products, a data storage section 144 that stores data, and so forth.

In the program product storage section 142, an OS that is a basic program product for making the asynchronous payment terminal 7 function, a program product for making the electronic money card perform the amount change processing and for making the electronic money server 2 perform recharging to add an amount corresponding to a shortfall, and so forth are stored.

In the data storage section 144, a terminal ID that is ID information of the asynchronous payment terminal 7, utilization log data that is the history of transactions with the portable terminal 5 or the electronic money card, and so forth are stored. This utilization log data is transmitted to the electronic money server 2 by batch processing that is performed by the CPU 131.

The display section 140 displays a payment amount, a before-payment balance, an after-payment balance, a shortfall if payment is impossible, and so forth on a liquid crustal device, for example.

The speaker 145 conveys, to the user, a payment tone, a tone indicating that payment is impossible, audio guidance, and so forth which are output from the output section 138. Here, the audio guidance is guidance for the user, such as "Payment cannot be made due to a shortfall." and "This electronic money card cannot be used.".

Moreover, the speaker 145 can generate ultrasound.

The ultrasound is assumed to be sound waves of a frequency of 20000 Hz or more per second and is inaudible to the human ear as stationary sound. The ultrasound is not perceived by the user or the clerk. Therefore, the ultrasound does not give the user or the clerk a discomfort feeling.

The ultrasound generated by the speaker 145 may be turned on and off at constant or variable time slots.

Moreover, to this ultrasound, for example, an ID for identifying the asynchronous payment terminal 7 may be attached and information of IP address ver6 may be attached.

Here, an example in which the ultrasound is generated is described; in addition to this, other waves, for example, electromagnetic waves (for example, lightwaves, infrared radiation, radio waves) and so forth may be adopted.

Figure 6:
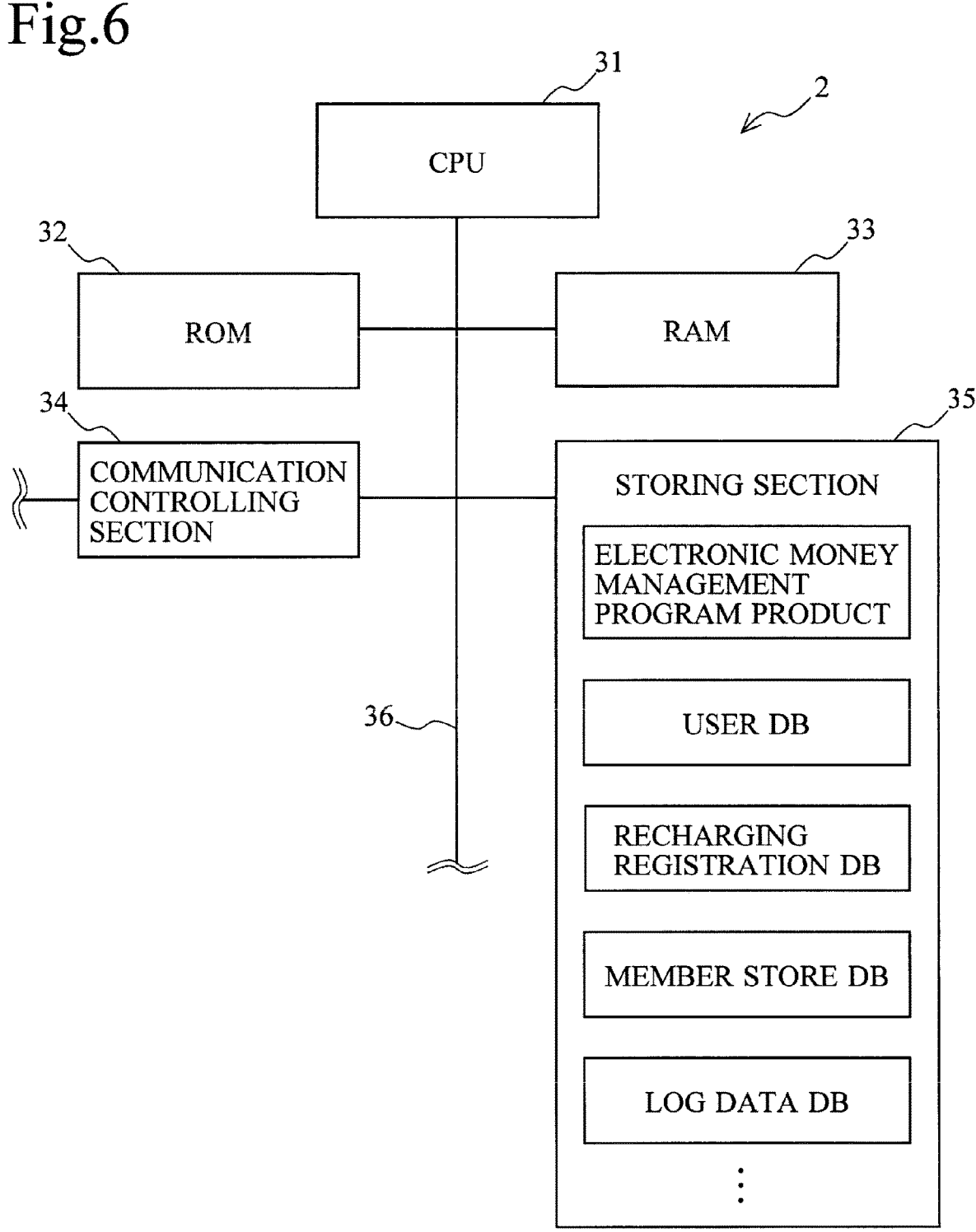
FIG. 6 is a diagram for explaining the configuration of an electronic money server.

FIG. 6 is a diagram for explaining the configuration of the electronic money server 2.

The electronic money server 2 is formed of a CPU 31, ROM 32, RAM 32, a communication controlling section 34, a storing section 35, and so forth which are connected to one another via a bus line 36.

The CPU 31 performs various kinds of information processing and overall control of the electronic money server 2 by executing the program product stored in the ROM 32 and the storing section 35. For example, the CPU 31 performs recharging in response to a request from the portable terminal 5.

In payment by the asynchronous payment terminal 7, the electronic money server 2 receives the log data whose value balance has been updated by the asynchronous payment terminal 7 from the asynchronous payment terminal 7 later and processes the log data.

Incidentally, in the case of the payment terminal 6 that can connect to the electronic money server 2 online, the payment terminal 6 can perform payment processing by value by updating the value balance in real time while performing communication.

The ROM 32 is read-only memory, and a basic program product used by the electronic money server 2 to operate, a parameter, data, and so forth are recorded thereon.

The RAM 33 is readable/writable memory and offers working memory used when the CPU 31 performs information processing.

With the communication controlling section 34, the electronic money server 2 performs communication with the payment terminal 6, the asynchronous payment terminal 7, and the portable terminal 5 via the communication line 8 and performs communication with the portable terminal 5 via the Internet 3.

The storing section 35 is formed of, for example, a large-capacity hard disk, and an electronic money management program product and other program products which are used by the CPU 31 to perform payment processing by value and recharging, a user DB (database) managing a user's value balance and the history of recharging, a recharging registration DB, a member store DB managing value payment performed in a member store, a log data DB storing log data of each payment processing, and so forth are recorded thereon.

Incidentally, in an example of FIG. 6, a single electronic money server 2 has been described, but this electronic money server 2 may be formed of a plurality of servers by distributing the functions thereof.

Next, the databases of the electronic money server 2 will be described by using each diagram of FIG. 7.

FIG. 7(1) is a diagram for explaining the logical configuration of the user DB.

In this embodiment, an electronic money number is stored in a state in which the electronic money number is related to a user ID. Though not depicted in the drawing, items such as authentication data of the IC module 30 are also stored.

An item "user ID" is user identification information.

An item "electronic money number" is a number for distinguishing a value balance from the value balances of other users.

An item "management value of a value balance" is a value balance identified by the item "electronic money number". This value balance is updated by using the received log data.

An item "setting of recharging" is an item for making an entry as to whether or not setting of recharging from the electronic money server 2 has been made.

Items "name", "address", "date of birth", "telephone number", and "e-mail address" are information for identifying a user. All of these items are not required registration items and may not be provided in some cases.

FIG. 7(2) is a diagram for explaining the logical configuration of the recharging registration DB.

The recharging registration DB is formed of "electronic money number", "setting of automatic recharging", "credit card number", "recharging amount to be added by one recharging operation", "daily limit of amount", "monthly limit of amount", "reference value balance", and other items.

The item "electronic money number" is used as a key in searching the user DB for a user registered in the user DB.

The item "setting of automatic recharging" is an item indicating that the user has made not only setting of recharging from the electronic money server 2 but also setting of "automatic recharging".

The "credit card number" is an item indicating the procurement source of recharging funds. Therefore, in some cases, "account number of a financial institution" or "ID determined by a telephone company which collects telephone charges" is used in place of the "credit card number".

When a plurality of payment means (a credit card, a savings account, and so forth) are used, the payment procedure can also be stored.

A withdrawal from a bank account is predicated on the presence of a contract between the user and a bank to make a withdrawal upon request from the electronic money server 2.

The items "recharging amount to be added by one recharging operation", "daily limit of amount", "monthly limit of amount", and "reference value balance" are arbitrary setting items. When the user makes a request to make settings, these items are recorded.

Here, the recharging amount to be added by one recharging operation is the amount that is added to the IC module 30 of the portable terminal 5 by one recharging operation. This setting eliminates the need to set the amount every time recharging is performed.

The daily limit of amount is the upper limit of the total recharging amount per day by recharging.

The monthly limit of amount is the upper limit of the total recharging amount per month. Moreover, a configuration may be adopted in which ceilings are set on the number of times per day and the number of times per month.

The reference value balance is a value balance used as a reference: when the value balance falls below this reference value balance, new recharging is performed. For example, recharging processing may be urged by e-mail from the electronic money server 2 when the value balance falls below this reference value balance.

Moreover, when automatic recharging is set, recharging is performed automatically when the value balance falls below this reference value balance. Therefore, when automatic recharging is set, the reference value balance is a required item.

Here, a case where the recharging funds are added to the telephone bill will be described.

When the portable terminal 5 has the telephone function and the user has made a contract with a mobile telephone company, it is also possible to add up the recharging amount and the telephone bill and charge the user to be billed.

This method is the same as a case where the purchase price of a digital content, for example, is added to the telephone bill.

In this case, the electronic money server 2 accesses a server of a mobile telephone business operator in place of the credit company server 300 and asks the server to collect the automatic recharging amount. At this time, the electronic money server 2 also notifies it of the ID received from the mobile telephone business operator in advance.

Next, the automatic recharging procedure will be described with reference to a flowchart of FIG. 8.

First, the electronic money application 29 determines whether or not a predetermined time has elapsed from the last time the value balance was checked (step 100). If the predetermined time has not elapsed (step 100; N), the electronic money application 29 checks again whether or not the predetermined time has elapsed in step 100.

On the other hand, if the predetermined time has elapsed (step 100; Y), the electronic money application 29 requests notification of the value balance by inputting a balance reference command to the IC module 30 (step 110).

When accepting the input of the balance reference command from the electronic money application 29, the IC module 30 reads the value balance from the storing section 27 and transmits the value balance to the electronic money application 29 (step 120).

When obtaining the value balance from the IC module 30, the electronic money application 29 compares the value balance with the balance reference amount stored in advance and determines whether or not the value balance is smaller than or equal to the balance reference amount (step 130).

If the value balance is greater than the balance reference amount (step 130; N), the electronic money application 29 goes back to the processing in step 100.

On the other hand, if the value balance is smaller than or equal to the balance reference amount (step 130; Y), the electronic money application 29 inputs an electronic money number reference command to the IC module 30 and reads the electronic money number.

Next, the electronic money application 29 accesses the electronic money server 2 and requests automatic recharging and transmits the electronic money number to the electronic money server 2 (step 140).

Incidentally, when an overwriting command is used as a recharging command, since the electronic money server 2 generates the overwriting command, the electronic money application 29 also reads the value balance and transmits the value balance to the electronic money server 2.

This recharging request may be performed without asking the user about a recharging request, or a configuration may be adopted in which a screen asking permission for automatic recharging from the user is displayed and automatic recharging is performed when permission for automatic recharging is received from the user.

Moreover, in this example, since this example is predicated on the authentication processing performed at the time of registration of automatic recharging, authentication is not performed at the time of automatic recharging, but a configuration may be adopted in which authentication is performed by requesting the entry of a password every time automatic recharging is performed.

When receiving the request for automatic recharging from the electronic money application 29, the electronic money server 2 checks whether or not a remote lock function which will be described later is on, and, if the remote lock function is on, the electronic money server 2 transmits an error message to the electronic money application 29 and ends the processing.

Moreover, a configuration in which sending and display of an error message are not performed may be adopted. If the remote lock function is not on, the electronic money server 2 searches the recharging registration DB for the recharging amount set by the user by using the electronic money number as a key.

Then, the electronic money server 2 determines whether or not this recharging meets the daily limit of amount and the monthly limit of amount set by the user (step 150).

Incidentally, the electronic money server 2 records the amount and the date and time of recharging every time recharging is performed and makes the determination by using this record.

Though not depicted in the drawing, if this recharging does not meet the daily limit of amount and the monthly limit of amount, the electronic money server 2 transmits an error message to the electronic money application 29 and ends the processing.

On the other hand, if this recharging meets these limits of amount, the electronic money server 2 accesses the credit company server 300 and performs processing of payment of an automatic recharging amount by using the credit card number registered by the user (step 160).

Incidentally, when automatic deduction from a bank account is used, the electronic money server 2 performs payment by using the bank account; when addition to the telephone bill is used, the electronic money server 2 accesses the server of the mobile telephone business operator and asks the server to collect the recharging amount.

Next, the electronic money server 2 generates a recharging command to increase the value balance by the recharging amount and sends the recharging command to the electronic money application 29 (step 170).

The electronic money application 29 receives the recharging command from the electronic money server 2 (step 180) and inputs the recharging command to the IC module 30 (step 190).

When receiving the input of the recharging command from the electronic money application 29, the IC module 30 executes the recharging command and increases (updates) the value balance by the recharging amount (step 200).

Then, the IC module 30 transmits a value balance increase completion notification to the electronic money application 29 (step 210).

Incidentally, transmission of the value balance request and the value balance in steps 110 and 120 is performed in a non-cipher mode because this transmission is performed only by sending a response.

On the other hand, since the input of the recharging command and the increase (update) of the value balance in steps 190 and 200 involve a change of the value balance, the input of the recharging command and the increase (update) of the value balance in steps 190 and 200 are performed in a cipher mode.

Incidentally, though not depicted in the drawing, when recharging is successfully performed, the IC module 30 notifies the electronic money server 2 of the successfully performed recharging via the electronic money application 29, and the electronic money server 2 records this recharging amount to use it in the next automatic recharging for checking the daily limit of amount and the monthly limit of amount.

Furthermore, a configuration can also be adopted in which the electronic money server 2 notifies the portable terminal 5 of the completion of recharging by e-mail or the like.

As described above, the electronic money application 29 checks the value balance of the IC module 30 on a regular basis, and this method is particularly effective when the electronic money application 29 does not always grasp the value balance of the IC module 30.

That is, since the IC module 30 can operate independently of the electronic money application 29, when the IC module 30 performs recharging or payment by performing communication with the asynchronous payment terminal 7, if the IC module 30 does not notify the electronic money application 29 of the recharging or the payment, the electronic money application 29 cannot grasp the value balance of the IC module 30.

With this configuration, as a result of the electronic money application 29 checking the value balance of the IC module 30 on a regular basis, it is possible to detect a state in which the value balance is below the balance reference amount.

Moreover, to prevent the recharging function from being abused by a third party after the portable terminal 5 falls into the hands of the third party, the portable terminal 2 has the remote lock function.

In the remote lock function, access from the user is received and, if user authentication is successfully performed, the recharging service is suspended. As the combination of information used for user identification, for example, (a user name, an e-mail address, a password), (a user name, a date of birth, an e-mail address, a password), (a telephone number, a date of birth, an e-mail address, a password), and so forth can be used.

Moreover, in this example, the electronic money server 2 generates a recharging command and the electronic money application 29 inputs the recharging command to the IC module 30, but a configuration may also be adopted in which the electronic money server 2 gives permission for the electronic money application 29 to perform recharging and the electronic money application 29 generates a recharging command.

Moreover, a configuration may also be adopted in which the electronic money application 29 plays a role in connecting the electronic money server 2 and the IC module 30 and the electronic money server 2 inputs a recharging command directly to the IC module 30.

Furthermore, in this example, the electronic money application 29 checks the value balance of the IC module 30 on a regular basis, but, for example, a configuration may also be adopted in which the electronic money application 29 checks the value balance of the IC module 30 at predetermined times, for example, at 8, 10, 13, . . . o'clock or after a lapse of a predetermined time from the time of the last recharging.

In addition, a configuration may also be adopted in which the electronic money application 29 checks the value balance of the IC module 30 immediately after payment (payment) is made by value of the IC module 30. Moreover, by sufficiently shortening the balance check cycle, it is possible to perform recharging immediately after payment is made.

Next, the first embodiment of the present invention will be described with reference to FIG. 9 and flowcharts of FIGS. 10 and 11.

Figure 9:
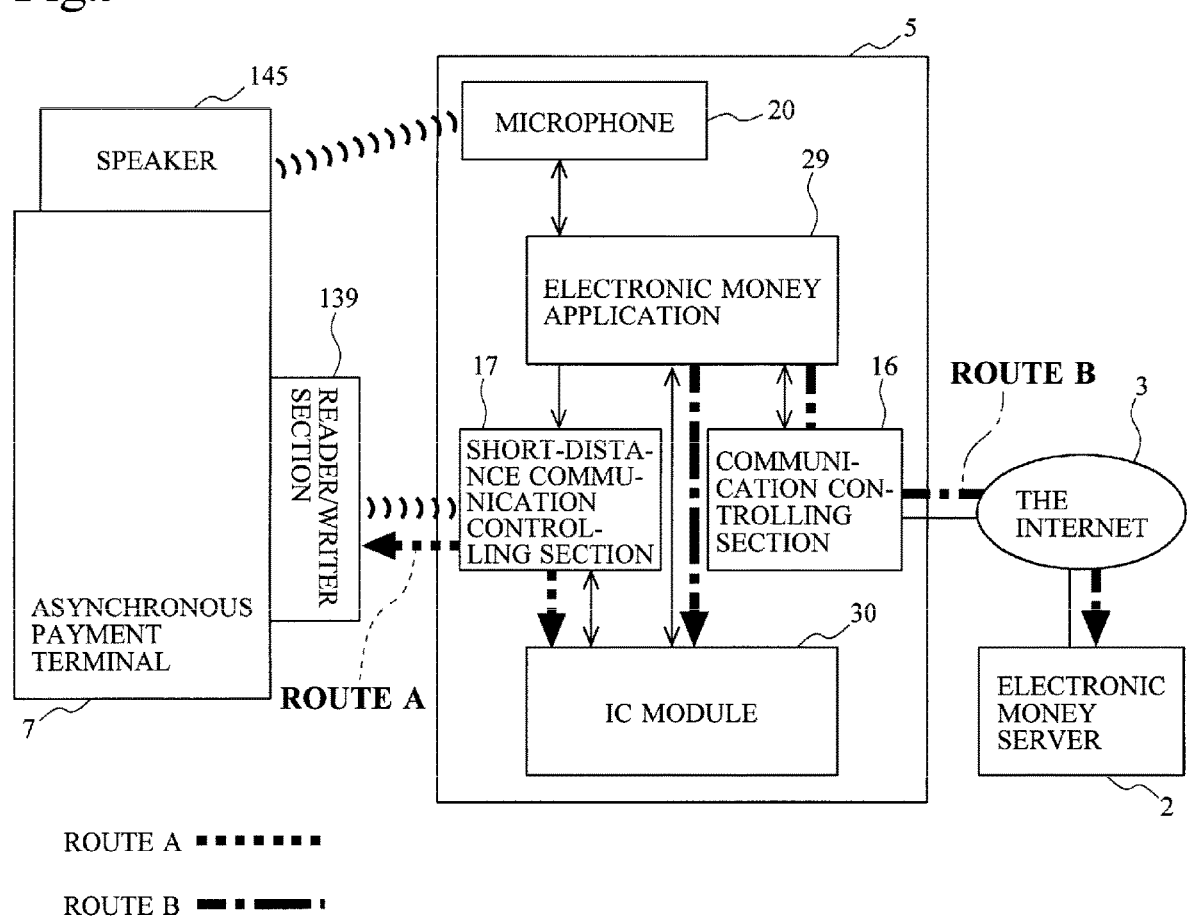
FIG. 9 is a diagram for explaining the configuration of this embodiment.

FIG. 9 is a diagram for explaining access to the IC module 30 incorporated into or attached to the portable terminal 5 from the reader/writer section 139 of the asynchronous payment terminal 7 and access to the IC module 30 from the electronic money server 2.

The IC module 30 corresponds to the information resource Ain the example depicted in FIG. 2 and does not have the function of controlling a conflict when a conflict between accesses occurs.

The IC module 30 includes a unit that stores a value balance and a unit that changes the balance by using balance change information.

The asynchronous payment terminal 7 includes the reader/writer section 139 provided with an antenna for short-distance radio communication and can access the IC module 30 via the short-distance communication controlling section 17 of the portable terminal 5. This route is called route A.

On the other hand, access from the electronic money server 2 is called route B. The route B is a route from the electronic money server 2 to the communication controlling section 16 via the Internet 3, to this communication controlling section 16, the electronic money application 29, and the IC module 30. Incidentally, it is assumed that access from the electronic money application 29 to the IC module 30 is also included in the route B.

The asynchronous payment terminal 7 corresponds to the first device in the example depicted in FIG. 2. Here, the asynchronous payment terminal 7 which is an offline access terminal is taken up as an example, but the first device may be a synchronous payment terminal or a thin client payment terminal, which is an online access terminal.

The data to be exchanged by the route A includes a balance reference command and an electronic money number reference command from the asynchronous payment terminal 7 and a response from the IC module 30. They are performed in the non-cipher mode because they are performed only by sending a response.

Moreover, by the route A, exchange of data that performs processing when payment or recharging is performed is also performed. This processing is performed in the cipher mode because this processing involves a change of the value balance.

As a recharging command to perform recharging, an addition command or an overwriting command can be used.

The addition command is an instruction to make the IC module 30 perform processing to add an amount corresponding to the designated amount. For example, when an amount corresponding to 2000 yen is added as recharging, the IC module 30 adds 2000 yen to the value balance stored in the IC module 30 in accordance with the addition command input from the asynchronous payment terminal 7 and writes a value after addition over the value balance.

The overwriting command is an instruction to make the IC module 30 perform overwriting processing by the designated amount.

For example, when recharging corresponding to 2000 yen is performed, the asynchronous payment terminal 7 first reads the value balance from the IC module 30 by a balance reference command. Then, the asynchronous payment terminal 7 adds 2000 yen to the value balance and inputs, to the IC module 30, an overwriting command to perform overwriting by a value after addition. The IC module 30 executes the command and performs overwriting on the value balance.

On the other hand, as a payment command that performs payment, a subtraction command or an overwriting command can be used. The subtraction command is an instruction that makes the IC module 30 perform subtraction processing by the designated amount.

For example, when payment corresponding to 2000 yen is performed, the IC module 30 subtracts 2000 yen from the stored value balance in accordance with the subtraction command input from the asynchronous payment terminal 7 and writes a value after subtraction over the value balance.

When payment is performed by an overwriting command, payment can be performed in the same manner as in a case where recharging is performed by the overwriting command.

Which to choose out of the addition command and the overwriting command as the recharging command and which to choose out of the subtraction command and the overwriting command as the payment command depend on the system design of the electronic money system 1.

Next, the route B by which access is performed from the electronic money server 2 via the Internet 3 will be described.

The processing related to this route B includes the automatic recharging described above. It is for this reason that the portable terminal 5 has the function of relaying the communication between the electronic money server 2 and the IC module 30. The portable terminal 5 corresponds to the second device in the example depicted in FIG. 2. This embodiment is predicated on the fact that the portable terminal 5 has a sound input function.

It is assumed that processing in this automatic recharging by which the electronic money application 29 accesses the IC module 30 to obtain the value balance (step 120 and step 130 of FIG. 8) is also included in the route B.

When access from the route A and access from the route B to the IC module 30 are performed independently at different times, the IC module 30 can process these accesses without problems. Moreover, even when there is a conflict between processing in the non-cipher mode from both routes, since they are processed only by sending a response, it is possible to perform parallel processing.

However, if access is performed from the other while one is performing processing in the cipher mode, the IC module 30 stops the processing in the cipher mode and performs the processing of the other access.

Figure 8:
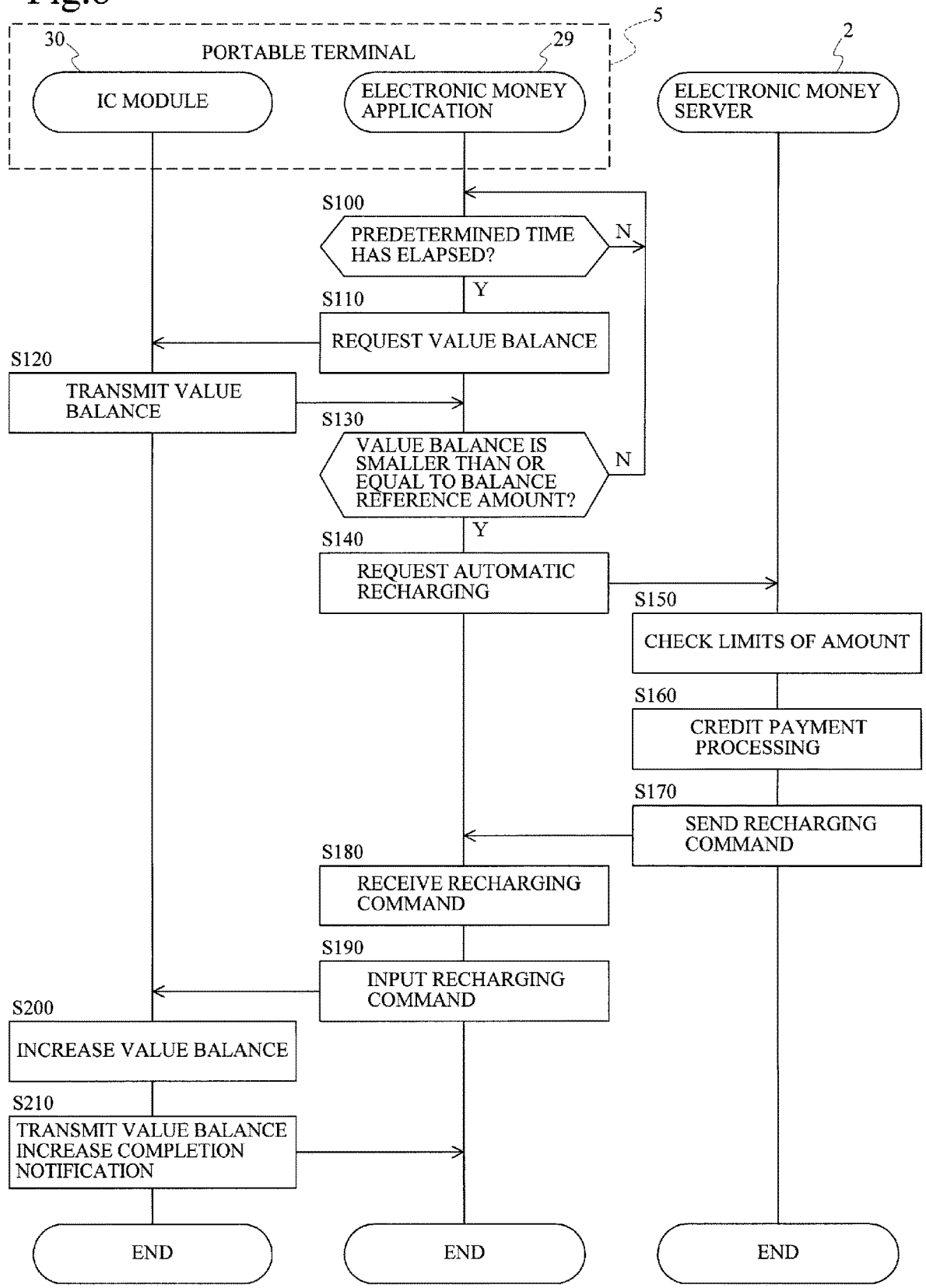
FIG. 8 is a flowchart describing the automatic recharging procedure.

For example, if a value balance request is received from the electronic money application 29 while payment processing is performed between the reader/writer section 139 of the asynchronous payment terminal 7 and the IC module 30, the IC module 30 stops the payment processing performed in the cipher mode and performs value balance transmission processing (FIG. 8, step 120). If the asynchronous payment terminal 7 is an entrance gate installed in a station, the passenger cannot enter or leave the station.

Therefore, in the first embodiment, the speaker 145 is provided in the asynchronous payment terminal 7 and is made to generate ultrasound having a predetermined pattern indicating that the asynchronous payment terminal 7 is accessing the IC module 30 while the asynchronous payment terminal 7 is performing processing in the cipher mode.

On the other hand, before processing that accesses the IC module 30 is generated, the electronic money application 29 turns on the microphone 20 and determines whether or not to receive the ultrasound having the predetermined pattern. If the microphone 20 receives the ultrasound having the predetermined pattern, the electronic money application 29 determines that the payment processing by the route A is being performed and refrains from performing processing to access the IC module 30 from the route B.

On the other hand, if the microphone 20 does not receive the ultrasound having the predetermined pattern, the electronic money application 29 determines that access from the route A is not performed and performs processing to access the IC module 30 from the route B.

The procedure of the first embodiment will be described with reference to the flowcharts of FIG. 10 and FIG. 11. The same processing as the processing depicted in FIG. 8 is identified with the same step numbers.

First, the electronic money application 29 determines whether or not a predetermined time has elapsed from the last check of the value balance (step 100). If the predetermined time has not elapsed (step 100; N), the electronic money application 29 checks again whether or not the predetermined time has elapsed in step 100. This predetermined time is set at 1 hour, for example, and it is assumed that the value balance is checked hourly.

On the other hand, if the predetermined time has elapsed (step 100; Y), the electronic money application 29 turns on the microphone 20 (step 102) and determines whether or not the ultrasound having the predetermined pattern has been detected (step 104). The reason why the microphone 20 is turned on with this timing is to minimize a time in which the microphone 20 is on. If no consideration is given to waste of a battery, the microphone 20 may always be turned on. Moreover, since the portable terminal 5 includes the acceleration sensor 21, a configuration may be adopted in which the microphone 20 is turned on only when the portable terminal 5 is in motion.

As a result of the determination in step 104, if the ultrasound having the predetermined pattern is detected (step 104; Y), the electronic money application 29 turns off the microphone 20 (step 109) and waits until 1 hour, for example, elapses.

On the other hand, if the ultrasound having the predetermined pattern is not detected (step 104; N), the electronic money application 29 requests notification of the value balance by inputting a value balance reference command to the IC module 30 (step 110).

When accepting the input of the value balance reference command from the electronic money application 29, the IC module 30 reads the value balance from the storing section 27 and transmits the value balance to the electronic money application 29 (step 120).

When obtaining the value balance from the IC module 30, the electronic money application 29 compares the value balance with the balance reference amount stored in advance and determines whether or not the value balance is smaller than or equal to the balance reference amount (step 130).

If the value balance is greater than the balance reference amount (step 130; N), the electronic money application 29 goes back to the processing in step 100.

On the other hand, if the value balance is smaller than or equal to the balance reference amount (step 130; Y), the electronic money application 29 inputs an electronic money number reference command to the IC module 30 and reads the electronic money number.

Next, the electronic money application 29 accesses the electronic money server 2 and requests automatic recharging and transmits the electronic money number to the electronic money server 2 (step 140).

The electronic money server 2 that has received the request for automatic recharging searches the recharging registration DB for the recharging amount set by the user by using the electronic money number as a key.

Then, the electronic money server 2 determines whether or not this recharging meets the daily limit of amount and the monthly limit of amount set by the user (step 150).

If this recharging meets these limits of amount, the electronic money server 2 accesses the credit company server 300 and performs processing of payment of an automatic recharging amount by using the credit card number registered by the user (step 160).

Incidentally, when automatic deduction from a bank account is used, the electronic money server 2 performs payment by using the bank account; when addition to the telephone bill is used, the electronic money server 2 accesses the server of the mobile telephone business operator and asks the server to collect the recharging amount.

Next, the electronic money server 2 generates a recharging command to increase the value balance by a recharging amount and sends the recharging command to the electronic money application 29 (step 170).

When receiving the recharging command from the electronic money server 2 (step 180), the electronic money application 29 determines whether or not the microphone 20 detects the ultrasound having the predetermined pattern at that stage (step 182). The determination as to whether or not the ultrasound is detected is made here again because there is a possibility that a time has elapsed from the determination in step 104 and the status has been changed.

As a result of this determination, if the ultrasound having the predetermined pattern is detected (step 182; Y), the electronic money application 29 refrains from accessing the IC module 30. Therefore, the electronic money application 29 is in a state in which the electronic money application 29 temporarily holds the received recharging command.

Then, after a lapse of a predetermined time, detection of the ultrasound is performed every 5 minutes, for example. Moreover, detection of the ultrasound having the predetermined pattern may be continuously performed until the ultrasound is not detected.

On the other hand, as a result of the determination, if the ultrasound having the predetermined pattern is not detected (step 182; N), since there is no possibility that a conflict with the route A occurs even when the IC module 30 is accessed, the electronic money application 29 inputs a recharging command to the IC module 30 (step 190).

When receiving the input of the recharging command from the electronic money application 29, the IC module 30 executes the recharging command and increases (updates) the value balance by the recharging amount (step 200).

Then, the IC module 30 transmits a value balance increase completion notification to the electronic money application 29 (step 210).

Thereafter, the electronic money application 29 turns off the microphone 20 (step 220) and ends the processing.

Incidentally, step 210 and step 220 may be performed the other way around.

According to the first embodiment, it is possible to implement autonomous conflict control between a plurality of devices that access the IC module 30 that does not have an adequate conflict control function without providing a special control circuit or the like.

Next, a second embodiment will be described.

In this embodiment, the speaker 145 generates ultrasound having a pattern in accordance with the priority of access to the IC module 30. The priority is expressed by a method such as alternately generating two types of frequency that turn on and off the high and low states of the ultrasound and the generation of the ultrasound in a fixed, not a constant, rhythm. Moreover, for example, ultrasound including numerical data indicating the priority may be generated.

On the other hand, the electronic money application 29 that has received the ultrasound having the pattern in accordance with the priority with the microphone 20 compares the priority indicated by the received ultrasound with the priority of processing which the electronic money application 29 was about to perform by accessing the IC module 30. As a result of the comparison, if the processing has lower priority, the electronic money application 29 refrains from performing access. On the other hand, if the processing has higher priority, the electronic money application 29 performs access.

The determination by comparison of the priorities is performed by the electronic money application 29, and there is the need to store the relationship between a predetermined pattern of ultrasound and priority and the priorities of accesses to the IC module 30 which the electronic money application 29 intends to perform in the storing section 18, for example, in advance.

An example of setting of the priorities will be described with reference to FIG. 12.

The priorities are set such that higher priority is given to what accesses the IC module 30 in a shorter time.

Moreover, the highest priority is given to an access device installed in a pass gate because, if the pass gate is closed, it may bring trouble not only to a person who has the portable terminal 5 but also to other people. Incidentally, the pass gates include not only an entrance gate installed in a station but also a gate that uses an electronic money number as an ID to manage access to a building.

Since an offline payment terminal completes processing locally, a time in which the offline payment terminal accesses the IC module 30 is short. It is for this reason that higher priority is given to the offline payment terminal than an online payment terminal.

Since a time in which online automatic recharging (route B) accesses the IC module 30 is the longest, the lowest priority is given to the online automatic recharging (route B).

Next, with reference to flowcharts of FIG. 13 and FIG. 14, the procedure of the second embodiment will be described. Incidentally, the same processing as that in FIG. 8, FIG. 10, and FIG. 11 is identified with the same step number.

First, the electronic money application 29 determines whether or not a predetermined time has elapsed from the last time the value balance was checked (step 100). If the predetermined time has not elapsed (step 100; N), the electronic money application 29 checks again whether or not the predetermined time has elapsed in step 100.

If the predetermined time has elapsed (step 100; Y), the electronic money application 29 turns on the microphone 20 (step 102) and determines whether or not ultrasound having a predetermined pattern is detected (step 104).

As a result of the determination in step 104, if the ultrasound having the predetermined pattern is detected (step 104; Y), the electronic money application 29 compares the priority of the processing indicated by the pattern of the detected ultrasound with the priority of the processing which the electronic money application 29 was about to perform (step 105). If the processing which the electronic money application 29 was about to perform has higher priority (step 106; Y), the electronic money application 29 requests notification of the value balance by inputting a value balance reference command to the IC module 30 (step 110).

On the other hand, if the processing indicated by the pattern of the detected ultrasound has higher priority (step 106; N), the electronic money application 29 turns off the microphone 20 (step 109) and waits until 1 hour, for example, elapses.

When accepting the input of the value balance reference command from the electronic money application 29, the IC module 30 reads the value balance from the storing section 27 and transmits the value balance to the electronic money application 29 (step 120).

When obtaining the value balance from the IC module 30, the electronic money application 29 compares the value balance with the balance reference amount stored in advance and determines whether or not the value balance is smaller than or equal to the balance reference amount (step 130).

If the value balance is greater than the balance reference amount (step 130; N), the electronic money application 29 goes back to the processing in step 100.

On the other hand, if the value balance is smaller than or equal to the balance reference amount (step 130; Y), the electronic money application 29 inputs an electronic money number reference command to the IC module 30 and reads the electronic money number.

Next, the electronic money application 29 accesses the electronic money server 2 and requests automatic recharging and transmits the electronic money number to the electronic money server 2 (step 140).

The electronic money server 2 that has received the automatic recharging request searches the recharging registration DB for the recharging amount set by the user by using the electronic money number as a key.

Then, the electronic money server 2 determines whether or not this recharging meets the daily limit of amount and the monthly limit of amount set by the user (step 150).

If this recharging meets these limits of amount, the electronic money server 2 accesses the credit company server 300 and performs processing of payment of an automatic recharging amount by using the credit card number registered by the user (step 160).

Next, the electronic money server 2 generates a recharging command to increase the value balance by the recharging amount and sends the recharging command to the electronic money application 29 (step 170).

When receiving the recharging command from the electronic money server 2 (step 180), the electronic money application 29 determines whether or not the microphone 20 detects the ultrasound having the predetermined pattern at that stage (step 182).

As a result of the determination, if the ultrasound having the predetermined pattern is detected (step 182; Y), the electronic money application 29 compares the priority of the processing indicated by the pattern of the detected ultrasound with the priority of the processing which the electronic money application 29 was about to perform (step 184).

As a result of the comparison, if the processing which the electronic money application 29 was about to perform has higher priority (step 185; Y), the electronic money application 29 inputs the recharging command to the IC module 30 (step 190).

On the other hand, if the processing indicated by the pattern of the detected ultrasound has higher priority (step 185; N), the electronic money application 29 waits until the ultrasound having the predetermined pattern is not detected. This brings the electronic money application 29 to a state in which the electronic money application 29 temporarily holds the received recharging command.

When receiving the input of the recharging command from the electronic money application 29, the IC module 30 executes the recharging command and increases (updates) the value balance by the recharging amount (step 200).

Then, the IC module 30 transmits a value balance increase completion notification to the electronic money application 29 (step 210).

Thereafter, the electronic money application 29 turns off the microphone 20 (step 220) and ends the processing.

According to the second embodiment, since the priorities are set for a plurality of devices that access the IC module 30, it is possible to implement autonomous conflict control more efficiently.

Next, re-access of the processing that has been suspended as a result of the detection of ultrasound having a predetermined pattern will be described.

Figure 10:
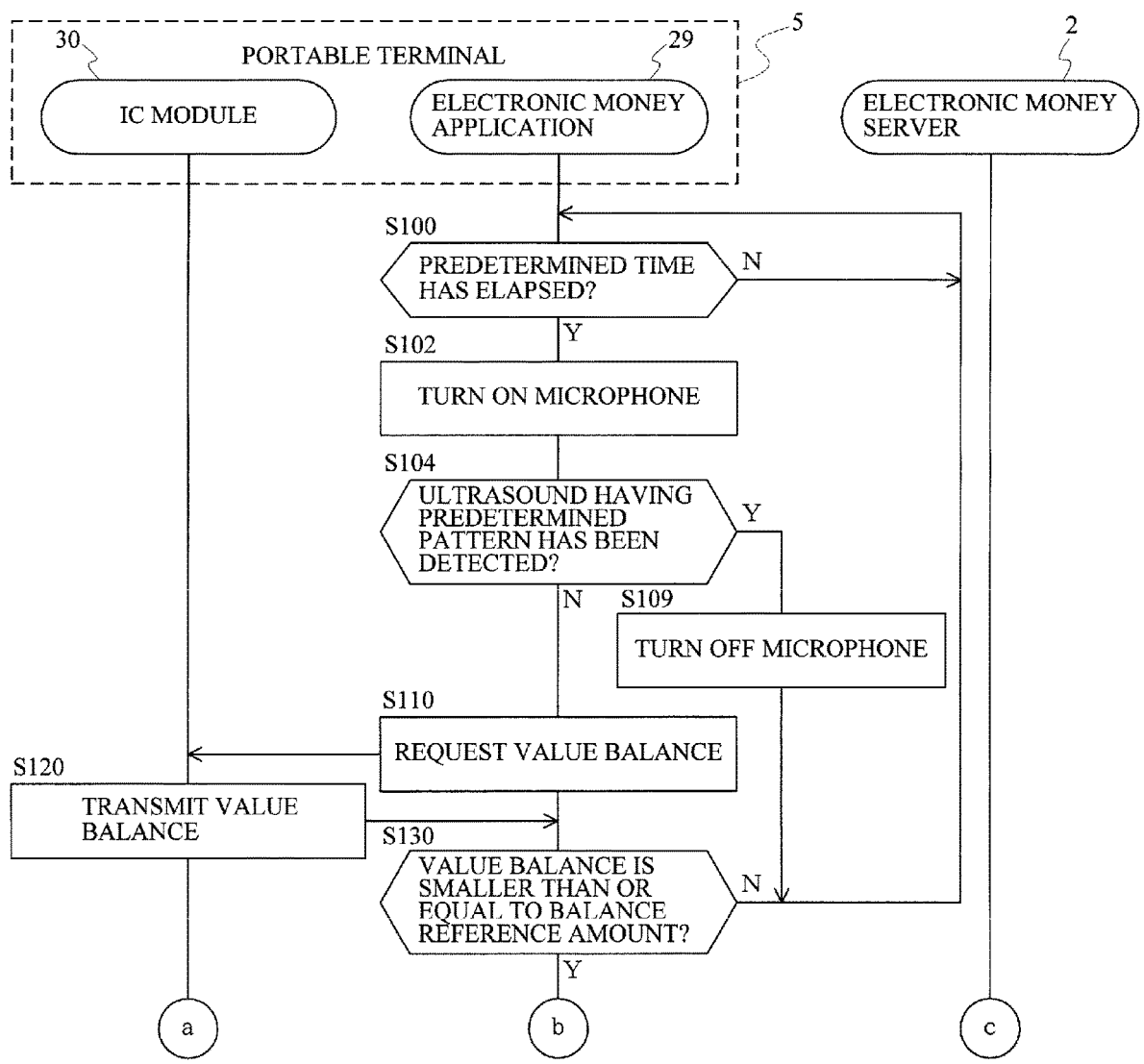
FIG. 10 is a flowchart describing the procedure of this embodiment.

In the first embodiment and the second embodiment, a configuration in which, when the electronic money application 29 detects ultrasound having a predetermined pattern (FIG. 10, step 104; Y), if the electronic money application 29 detects ultrasound having a pattern indicating the processing having higher priority than the processing which the electronic money application 29 was about to perform (FIG. 13, step 106; N), the electronic money application 29 suspends the processing and waits until a predetermined time elapses has been described.

As another example, when the electronic money application 29 detects ultrasound having a predetermined pattern or detects ultrasound having a pattern indicating the processing having higher priority than the processing which the electronic money application 29 was about to perform, the electronic money application 29 suspends the processing and continuously performs detection of ultrasound. Then, after the electronic money application 29 stops detecting the ultrasound having the predetermined pattern or stops detecting the ultrasound having the pattern indicating the processing having higher priority than the processing which the electronic money application 29 was about to perform, the electronic money application 29 accesses the IC module 30.

In this example, it is possible to implement autonomous conflict control, and the electronic money application 29 can perform the suspended access as soon as possible.

Next, another example of re-access of the processing that has been suspended as a result of the detection of ultrasound having a predetermined pattern will be described.

A configuration is adopted in which a particular terminal of the IC module 30 is on while the IC module 30 is connecting to an external terminal, for example, when the IC module 30 is performing short-distance communication with the reader/writer section 139. Therefore, when the electronic money application 29 detects ultrasound having a predetermined pattern or detects ultrasound having a pattern indicating the processing having higher priority than the processing which the electronic money application 29 was about to perform, the electronic money application 29 suspends the processing and monitors this particular terminal. Then, after the particular terminal is turned off (which indicates that connection to the external terminal is over), the electronic money application 29 accesses the IC module 30.

Also in this example, it is possible to implement autonomous conflict control, and the electronic money application 29 can perform the suspended access as soon as possible without using the microphone 20.

Next, ON and OFF of the microphone 20 will be described.

Figure 13:
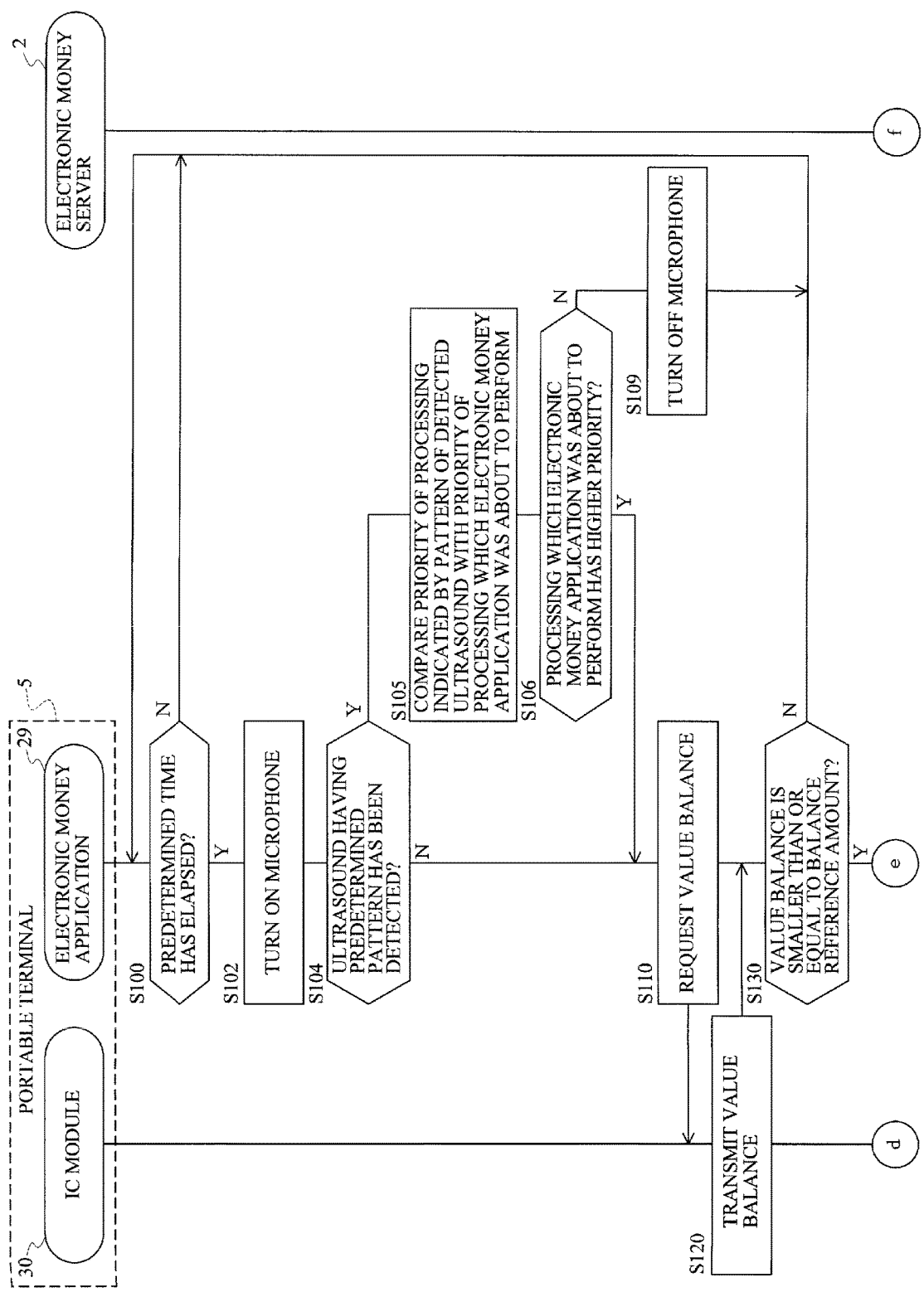
FIG. 13 is a flowchart describing the procedure of a second embodiment.

A time at which the microphone 20 is turned on is a time immediately before the electronic money application 29 accesses the IC module 30 (FIG. 10, step 102, FIG. 13, step 102).

Figure 11:
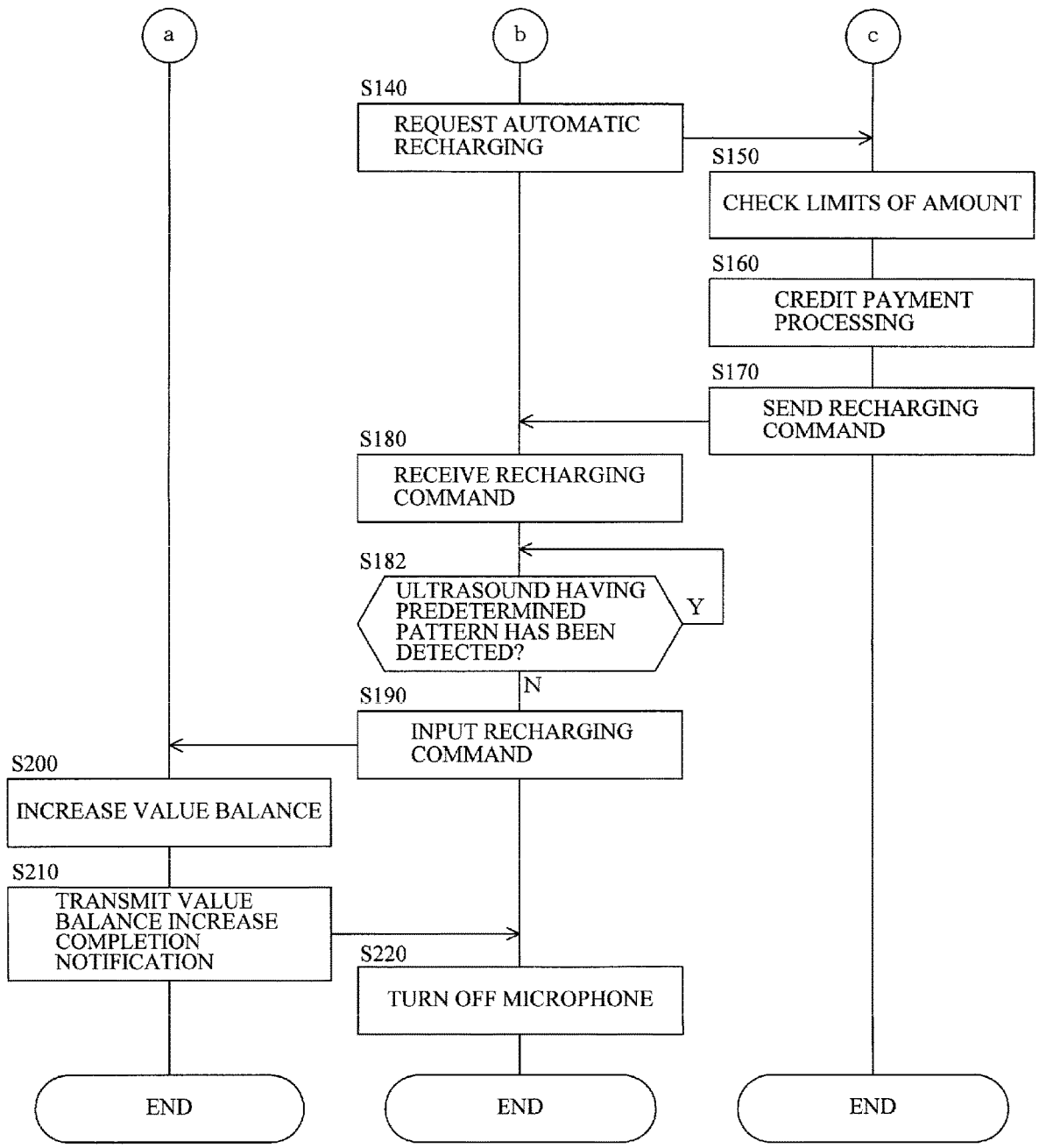
FIG. 11 is a flowchart describing the procedure of this embodiment.

A time at which the microphone 20 is turned off is a time after the electronic money application 29 becomes accessible to the IC module 30 (FIG. 11, step 109, FIG. 13, step 109).

Moreover, when the electronic money application 29 detects ultrasound having a predetermined pattern (FIG. 10, step 104; Y) or when the electronic money application 29 detects ultrasound having a pattern indicating the processing having higher priority than the processing which the electronic money application 29 was about to perform (FIG. 13, step 106; N), after suspending the processing, if the electronic money application 29 does not perform access by the next predetermined time, the electronic money application 29 turns off the microphone 20 after suspending the processing (FIG. 10, step 109, FIG. 12, step 109).

However, when the detection of ultrasound is continuously performed, the microphone 20 is made to remain in an ON state.

As another example, by using the acceleration sensor 21 of the portable terminal 5, the microphone 20 may be turned on when the portable terminal 5 is in motion; when the portable terminal 5 is not in motion, the microphone 20 may be turned off because there is no possibility that payment or the like is performed.

Moreover, by using the GPS receiver 23 of the portable terminal 5, the microphone 20 may be turned on when the portable terminal 5 moves closer to the station stored in advance or a place in which payment was made in the past and turned off when the portable terminal 5 moves away therefrom.

Figure 14:
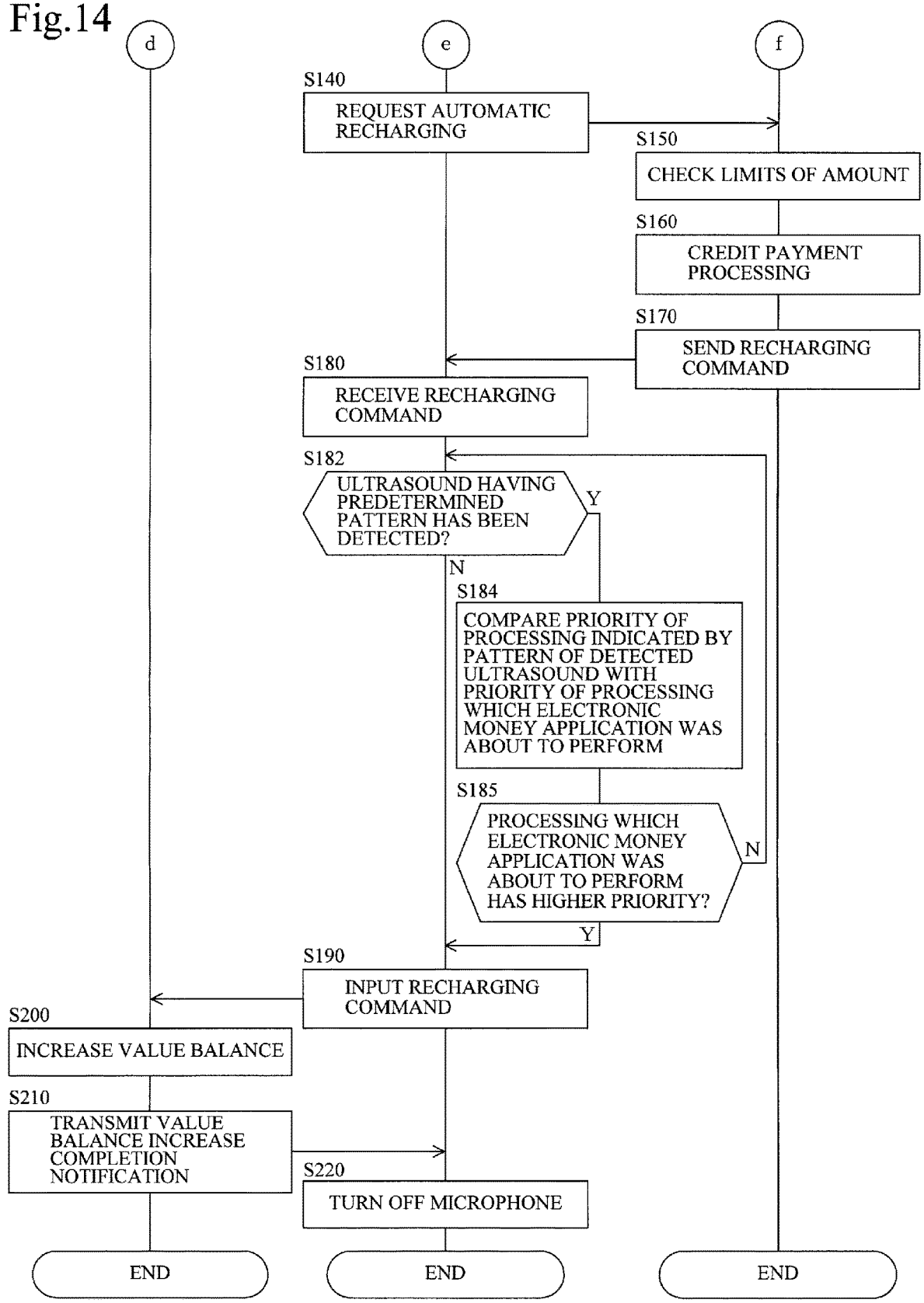
FIG. 14 is a flowchart describing the procedure of a second embodiment.

In the first embodiment and the second embodiment described above, the example in which determination as to whether or not ultrasound having a predetermined pattern has been detected while the electronic money application 29 that has received a recharging command from the electronic money server 2 transfers the recharging command to the IC module 30 is made and the presence or absence of the transfer is controlled based on the determination result has been described (step 180 to step 190 of FIG. 11, step 180 to step 190 of FIG. 14).

On the other hand, a configuration may also be adopted in which determination as to whether or not the electronic money application 29 has detected ultrasound having a predetermined pattern is made continuously or on a regular basis while recharging processing is performed between the electronic money server 2 and the IC module 30 and, if the ultrasound having the predetermined pattern is detected, an error signal is transmitted to the electronic money server 2. Furthermore, it is also possible to determine whether or not to transmit an error signal based on the priority. The electronic money server 2 that has received the error signal may suspend the processing which is being performed between the electronic money server 2 and the IC module 30 depending on the progress of the processing, for example.

In the first embodiment and the second embodiment described above, the example in which priority is given to access from the reader/writer section 139 of the asynchronous payment terminal 7 to the IC module 30 has been mainly described. That is, the example gives priority to the route A depicted in FIG. 9 and refrains from performing access by the route B.

However, in actuality, it is sometimes necessary to give priority to access by the route B. Specifically, it is necessary to give priority to access by the route B when there is a possibility that payment cannot be made because of a reduced value balance or there is a possibility that, if it is used as a commuter ticket, an entrance gate of a station is not opened because the commuter ticket has expired.

Such a case gives priority to automatic recharging by the route B and refrains from performing access by the route A until automatic recharging is completed.

However, the user may pass the portable terminal 5 over the reader/writer section 139 during automatic recharging.

Therefore, methods for making it refrain from performing access by the route A during automatic recharging will be described below.

(1) When access is performed from the reader/writer section 139 to the IC module 30, the access is performed via the short-distance communication controlling section 17. Therefore, the operation of the short-distance communication controlling section 17 is suspended. Specifically, power supply to the short-distance communication controlling section 17 is suspended or, when an ON/OFF switch is provided, this switch is turned off.

(2) Control is performed such that communication between the short-distance communication controlling section 17 and the IC module 30 is interrupted.

(3) When the payment terminal 6 by which the user will make payment is an online payment terminal, information on an IP address is attached to waves (for example, ultrasound) to be generated by the payment terminal 6 and then the waves are generated.

Then, the electronic money application 29 that has received the waves (for example, ultrasound) with the microphone 20 transmits a packet containing information "Refrain from accessing the IC module 30 because automatic recharging is being performed" directly to the IP address.

The online payment terminal 6 that has received it does not access the IC module 30 even when the portable terminal 5 is passed over the reader/writer section 139.

Next, a third embodiment (and a first modified example and a second modified example thereof) and a fourth embodiment will be described.

FIG. 15 is a diagram for explaining the relationship between each processing state of the asynchronous payment terminal 7 and the ultrasound generation status of the speaker 145 that generates ultrasound in the third embodiment and the fourth embodiment.

Pattern 1 of this diagram corresponds to the third embodiment, pattern 2 corresponds to the first modified example of the third embodiment, pattern 3 corresponds to the second modified example of the third embodiment, and pattern 4 corresponds to the fourth embodiment.

First, in the third embodiment, the electronic money application 29 senses the status of access of the asynchronous payment terminal 7 to the IC module 30 and controls the access (the route B in FIG. 9) to the IC module 30 passing through itself (the electronic money application 29) based on this sensing result.

This embodiment differs from the first embodiment in that, while, in the procedures described in FIG. 10 and FIG. 11, detection of ultrasound having a predetermined pattern is performed in step 182, in the third embodiment, detection of ultrasound having a predetermined pattern is continuously performed.

In this embodiment, as depicted in pattern 1 of FIG. 15, when the portable terminal 5 accesses the reader/writer section 139 and processing in the cipher mode is being performed, the speaker 145 of the asynchronous payment terminal 7 generates ultrasound. On the other hand, when processing in the non-cipher mode is being performed and communication is not performed (the portable terminal 5 does not access the reader/writer section 139), the speaker 145 does not generate ultrasound.

Next, the procedure of the third embodiment will be described.

First, before access is performed (from step 100 to step 109 of the flowchart of FIG. 10), the same processing as that of the first embodiment is performed.

That is, before issuing a value balance request, the electronic money application 29 senses whether or not ultrasound is detected by the microphone 20.

If the ultrasound is detected, which indicates that processing in the cipher mode is being performed in the reader/writer section 139 of the asynchronous payment terminal 7, the electronic money application 29 waits until the microphone 20 stops detecting the ultrasound.

Then, when the ultrasound is not detected by the microphone 20, the electronic money application 29 starts accessing the IC module 30. By doing so, a conflict between accesses to the IC module 30 is avoided.

Incidentally, when the ultrasound is detected, the value balance request or the input of the recharging command may be abandoned (access is stopped) and an error may be returned.

Then, after access to the IC module 30 is started (a period from step 110 of the flowchart of FIG. 10 to the reception of the value balance in step 130 and a period from the input of the recharging command (step 190) of the flowchart of FIG. 11 to the reception of the value balance increase completion notification in step 220), the electronic money application 29 continuously monitors the presence or absence of the detection of ultrasound by the microphone 20 in parallel with this access. In this respect, this embodiment differs from the first embodiment.

Before the access is completed (in step 210, before the value balance increase completion notification is received from the IC module 30), if the ultrasound is detected by the microphone 20, the electronic money application 29 temporarily suspends or abandons the value balance request or the recharging command input which is being performed at that point.

In the case of temporarily suspension, the electronic money application 29 resumes the processing when the microphone 20 stops detecting the ultrasound. On the other hand, in the case of abandonment, the electronic money application 29 returns an error.

Incidentally, in place of temporarily suspension or abandonment, the processing may be continuously performed. For example, when the ultrasound is detected in a state in which the electronic money application 29 waits for a value balance to be transmitted in response to the value balance request, the electronic money application 29 may be made to remain in this transmission waiting state.

In the third embodiment, the speaker 145 of the asynchronous payment terminal 7 may be made to generate ultrasound also in the non-cipher mode.

In this case, ultrasound is generated when the asynchronous payment terminal 7 accesses the IC module 30, and a state in which no ultrasound is generated indicates that the asynchronous payment terminal 7 does not access the IC module 30.

Figure 16:
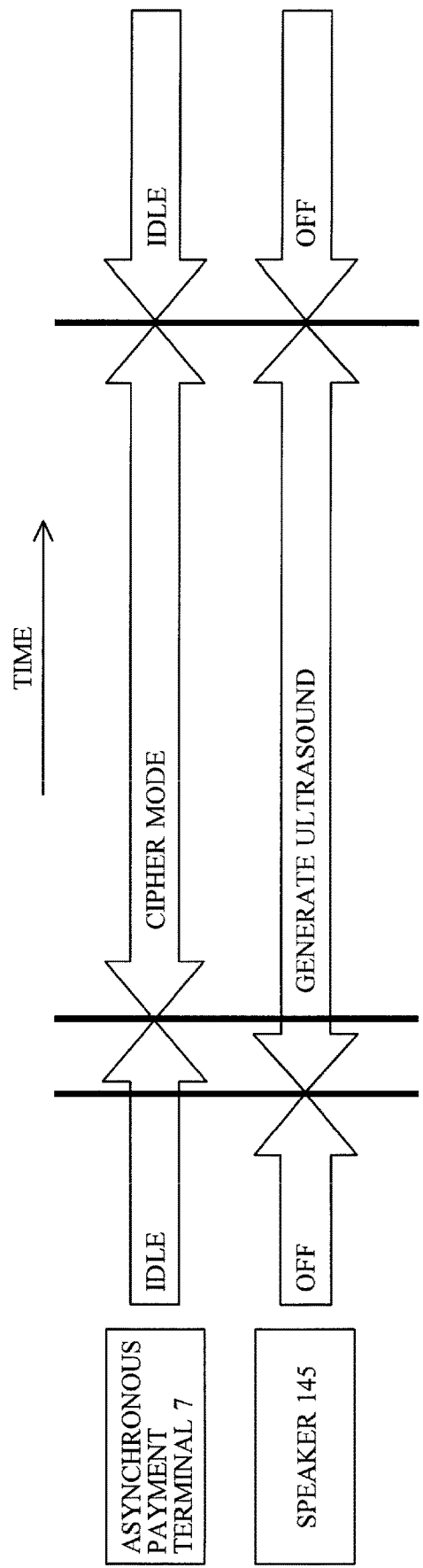
FIG. 16 is a diagram explaining the temporal relationship between the transition to a cipher mode and the generation of ultrasound.

Moreover, in the third embodiment, as depicted in FIG. 16, prior to the transition to the cipher mode, ultrasound may be generated from the speaker 145 of the asynchronous payment terminal 7.

Before the mode is caused to transition to the cipher mode, processing in the non-cipher mode (for example, an electronic money number request, a value balance request) is performed, and ultrasound is generated at that stage. By performing processing in this manner, it is possible to reduce the occurrence of an access conflict more effectively.

Incidentally, as depicted in FIG. 16, the completion of the cipher mode and the completion of the generation of ultrasound are performed practically at the same time.

According to the third embodiment, the electronic money application 29 senses the access status of the asynchronous payment terminal 7 to the IC module 30 and controls the access to the IC module 30 performed via the electronic money application 29 based on the sensing result. Therefore, it is possible to avoid an access conflict while suppressing the effect on access from the asynchronous payment terminal 7 to the IC module 30 and access to the IC module 30 via the electronic money application 29.

That is, a situation in which one of accesses is sacrificed to avoid an access conflict is less likely to occur. In particular, it is possible to reduce an unexpected interruption of access performed via the electronic money application 29 and the detrimental effect on the progress of the access processing.

Next, Modified Example 1 of the third embodiment will be described.

In Modified Example 1, as depicted in pattern 2 of FIG. 15, the speaker 145 of the asynchronous payment terminal 7 does not generate ultrasound when the portable terminal 5 accesses the reader/writer section 139 and processing in the cipher mode is performed. On the other hand, when processing in the non-cipher mode is performed and no communication is performed (the portable terminal 5 does not access the reader/writer section 139), the speaker 145 generates ultrasound. That is, processing opposite to pattern 1 is performed.

Then, when the microphone 20 stops detecting the ultrasound, the electronic money application 29 temporarily suspends or abandons the value balance request or the recharging command input which is being performed at that point. Then, in the case of temporarily suspension, the electronic money application 29 resumes the processing when the ultrasound is detected by the microphone 20.

That is, processing opposite to that of the third embodiment is performed.

Next, Modified Example 2 of the third embodiment will be described.

In Modified Example 2, as depicted in pattern 3 of FIG. 15, the speaker 145 of the asynchronous payment terminal 7 generates ultrasound of a first frequency when the portable terminal 5 accesses the reader/writer section 139 and processing in the cipher mode is performed. On the other hand, when processing in the non-cipher mode is performed and no communication is performed (the portable terminal 5 does not access the reader/writer section 139), the speaker 145 generates ultrasound of a second frequency that is different from the first frequency.

Then, when the electronic money application 29 detects the ultrasound of the first frequency by the microphone 20, the electronic money application 29 temporarily suspends or abandons the value balance request or the recharging command input which is being performed at that point. Then, in the case of temporarily suspension, the electronic money application 29 resumes the processing when the ultrasound of the second frequency is detected by the microphone 20.

Also in Modified Example 1 and Modified Example 2, it is possible to avoid an access conflict while suppressing the effect on access from the asynchronous payment terminal 7 to the IC module 30 and access to the IC module 30 via the electronic money application 29.

Next, the fourth embodiment will be described.

In the fourth embodiment, as depicted in pattern 4 of FIG. 15, when the portable terminal 5 accesses the reader/writer section 139, processing in the cipher mode is performed, processing in the non-cipher mode is performed, and no communication is performed (the portable terminal 5 does not access the reader/writer section 139), the speaker 145 of the asynchronous payment terminal 7 generates ultrasound. That is, the speaker 145 always generates ultrasound of predetermined intensity. This intensity is set based on the range in which the reader/writer section 139 can perform communication. In particular, the range in which the ultrasound generated from the speaker 145 at this intensity can be detected by the microphone 20 (the range of the position of the microphone 20 with reference to the position of the speaker 145) corresponds to the range in which the reader/writer section 139 can perform communication and practically coincides with it, for example.

Also in the fourth embodiment, processing that is performed when the ultrasound is detected by the microphone 20 is the same as that of the third embodiment.

That is, when the ultrasound is detected before access to the IC module 30 is started, the electronic money application 29 waits until the microphone 20 stops detecting the ultrasound.

Then, when the microphone 20 stops detecting the ultrasound, the electronic money application 29 starts accessing the IC module 30.

On the other hand, after access is started, when the ultrasound is detected by the microphone 20 before the access is completed, the electronic money application 29 temporarily suspends or abandons the value balance request or the recharging command input which is being performed at that point.

In the third embodiment, in pattern 1 of FIG. 15, even when the portable terminal 5 and the asynchronous payment terminal 7 are so close to each other that the portable terminal 5 and the asynchronous payment terminal 7 can perform communication with each other, the electronic money application 29 starts access unless the asynchronous payment terminal 7 is in the cipher mode.

On the other hand, in the fourth embodiment, in pattern 4 of FIG. 15, when the portable terminal 5 and the asynchronous payment terminal 7 are so close to each that the portable terminal 5 and the asynchronous payment terminal 7 can perform communication with each other, the electronic money application 29 refrains from accessing the IC module 30.

That is, the "access status" of the asynchronous payment terminal 7 that is sensed by the electronic money application 29 in the third embodiment is the status indicating whether or not the asynchronous payment terminal 7 is performing access in the cipher mode.

On the other hand, the "access status" in the fourth embodiment is the status indicating whether or not the asynchronous payment terminal 7 is in a state in which the asynchronous payment terminal 7 can perform communication with the portable terminal 5.

Also in the fourth embodiment, it is possible to avoid an access conflict while suppressing the effect on access from the asynchronous payment terminal 7 to the IC module 30 and access to the IC module 30 via the electronic money application 29.

Next, a fifth embodiment will be described.

Figure 17:
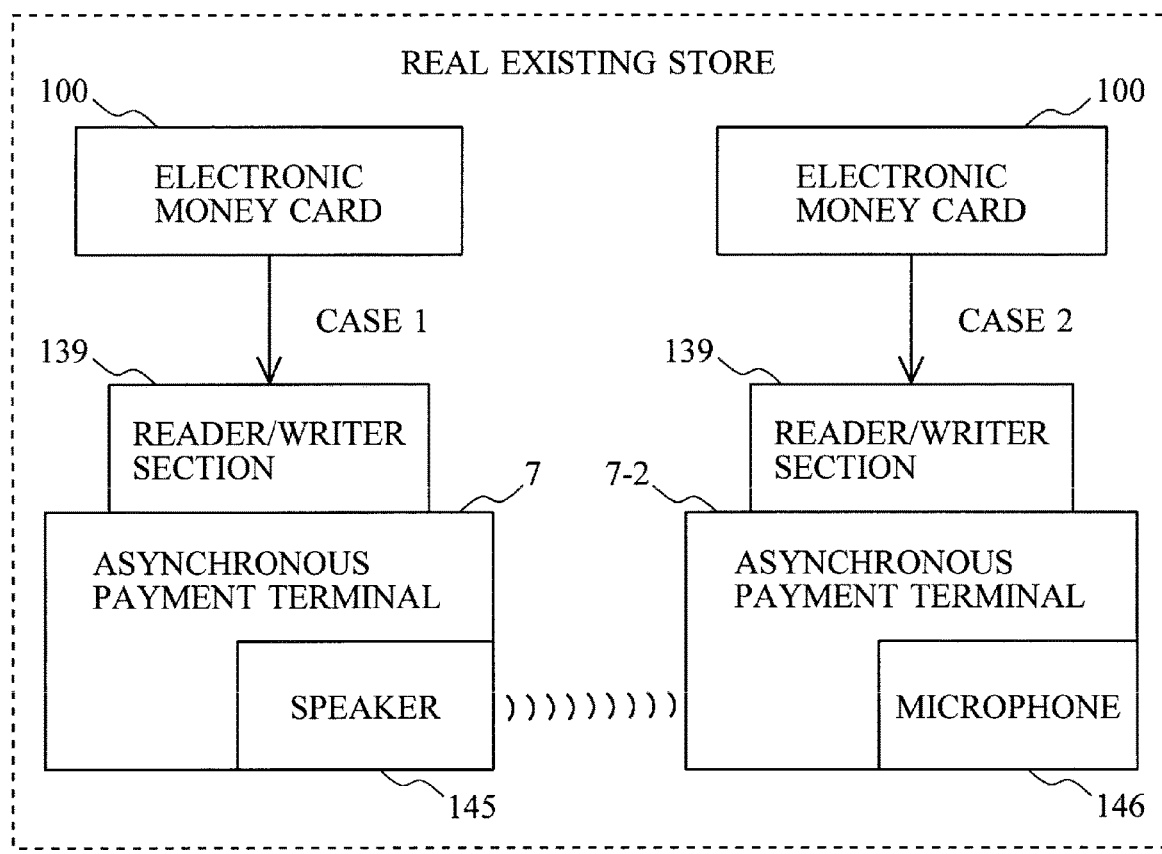
FIG. 17 is a diagram for explaining the placement of asynchronous payment terminals in a real existing store according to a fifth embodiment.

In this embodiment, as depicted in FIG. 17, the asynchronous payment terminal 7 and an asynchronous payment terminal 7-2 are installed in proximity to each other in a real existing store. They are so close to each other that, if an electronic money card 100 is held over one of them, the electronic money card 100 can also perform communication with the other.

As is the case with the portable terminal 5, the electronic money card 100 has a built-in IC module 30, and this IC module 30 functions as a payment device that stores the balance (value balance) of money value (value).

Then, when payment processing is performed, as is the case with the portable terminal 5, the IC module 30 updates (reduces) the terminal-side value balance in response to a request to update (reduce) the value balance from the asynchronous payment terminal 7 via the short-distance communication controlling section 17.

Figure 18:
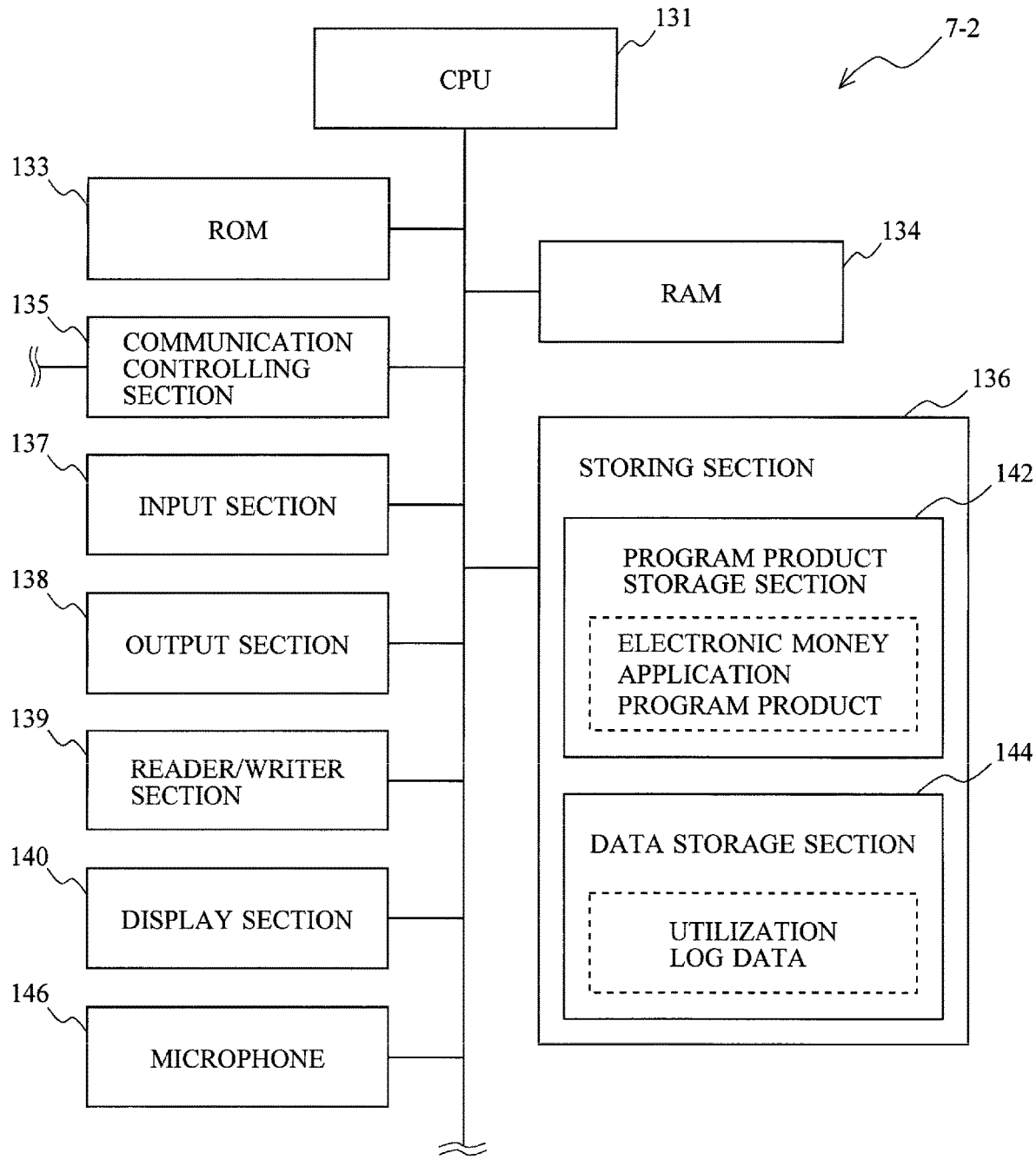
FIG. 18 is a diagram for explaining the configuration of the asynchronous payment terminal used in the fifth embodiment.

Here, as depicted in FIG. 18, in the asynchronous payment terminal 7-2, a microphone 146 that senses ultrasound is provided. Moreover, when the electronic money application program product stored in the program product storage section 142 is executed, an electronic money application 29 similar to that of the portable terminal 5 depicted in FIG. 3 is formed in the asynchronous payment terminal 7-2.

Here, as depicted in FIG. 17, a case where the electronic money card 100 is passed over the asynchronous payment terminal 7 is assumed to be case 1 and a case where the electronic money card 100 is passed over the asynchronous payment terminal 7-2 is assumed to be case 2.

Figure 19:
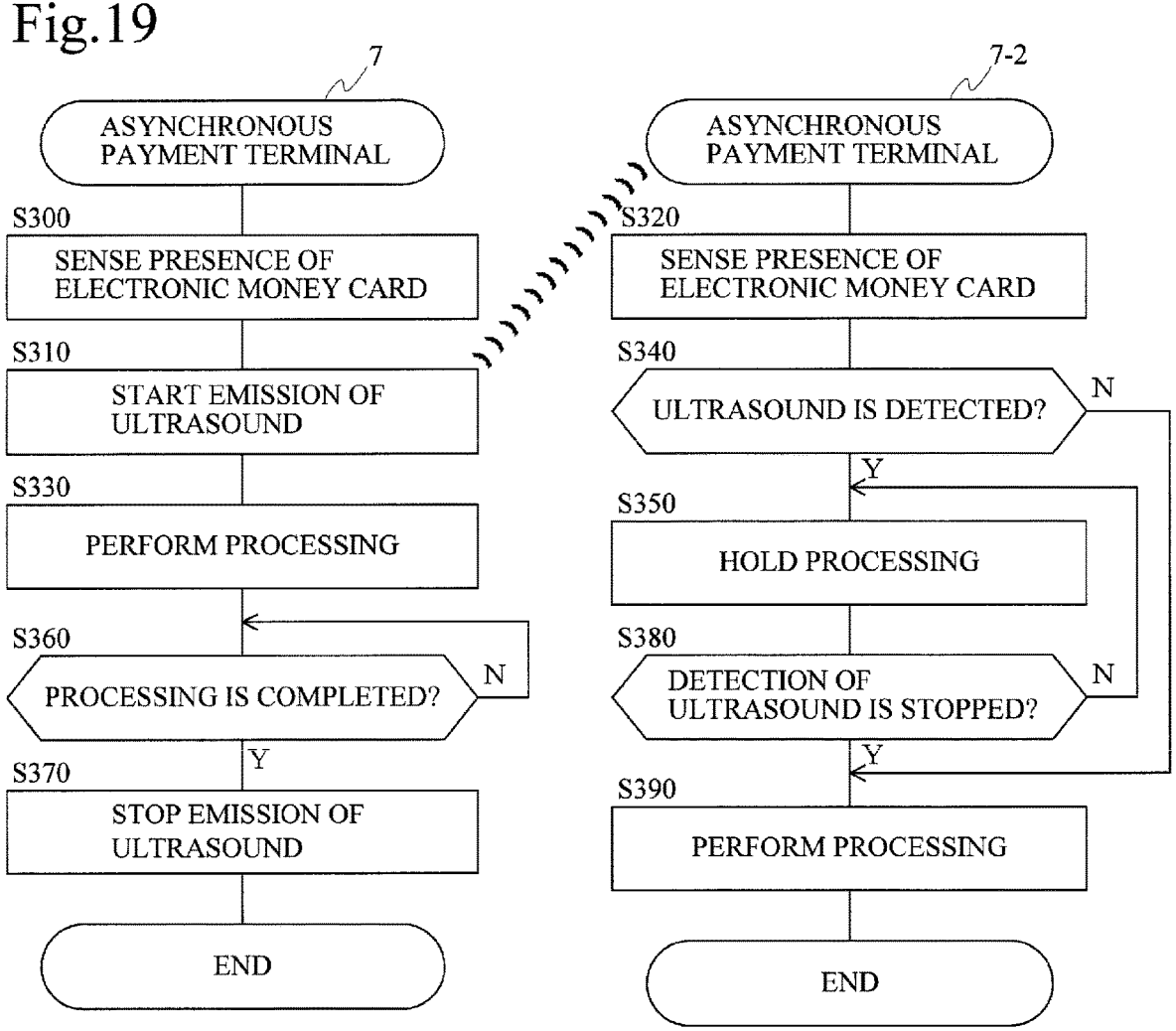
FIG. 19 is a flowchart describing the procedure of a fifth embodiment.
Figure 20:
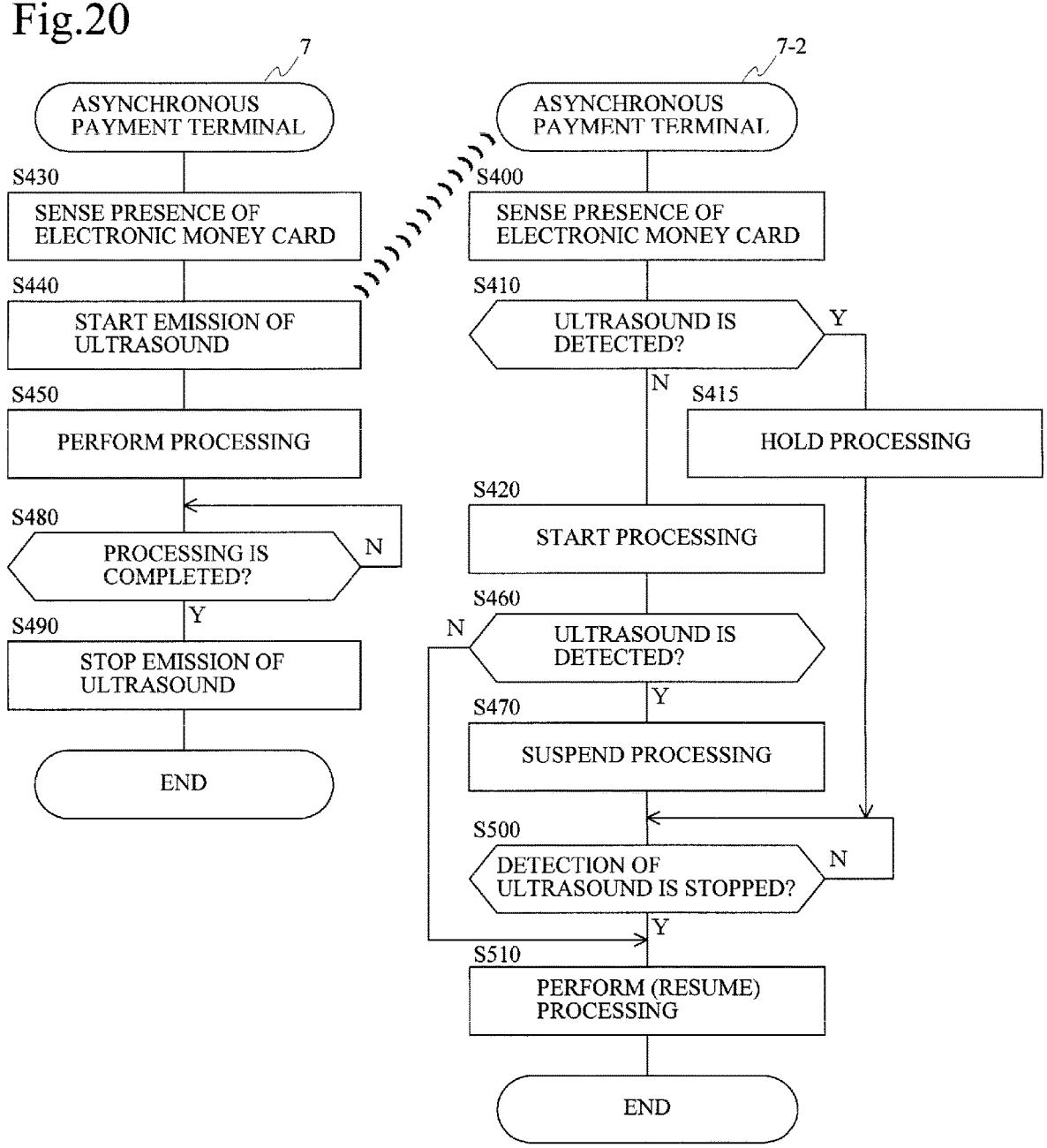
FIG. 20 is a flowchart describing the procedure of a fifth embodiment.
Figure 21:
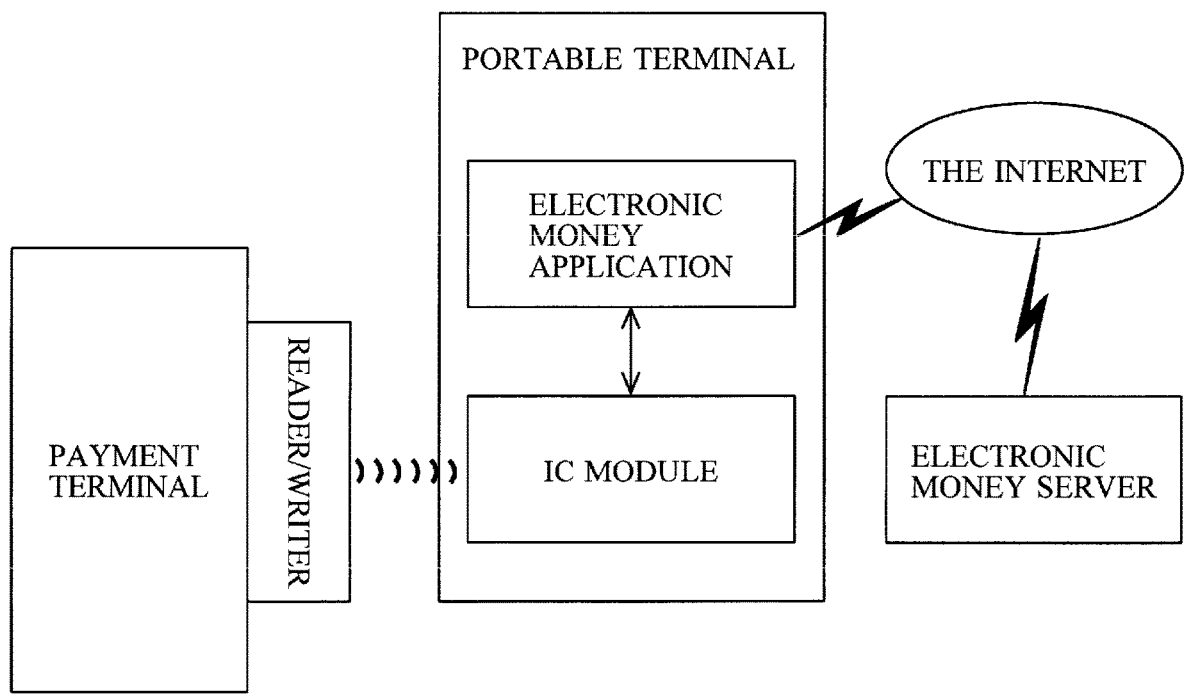
FIG. 21 is a diagram for explaining a state in which a plurality of devices access a single information resource.

The procedure of FIG. 5 will be described with reference to flowcharts of FIGS. 19 and 20.

First, case 1 (a case where the electronic money card 100 first moves closer to the asynchronous payment terminal 7) depicted in FIG. 17 will be described with reference to the flowchart of FIG. 19.

The asynchronous payment terminal 7 senses the presence of the electronic money card 100 (step 300) and starts emission of ultrasound from the speaker 145 (step 310).

Then, the asynchronous payment terminal 7 performs communication with the electronic money card 100 and performs processing such as confirmation of balance or writing (step 330).

Then, when such processing is completed (step 360; Y), the asynchronous payment terminal 7 stops emission of ultrasound from the speaker 145 (step 370).

On the other hand, when the electronic money card 100 moves closer to the asynchronous payment terminal 7, since the asynchronous payment terminal 7-2 is farther away from the electronic money card 100 than the asynchronous payment terminal 7, the asynchronous payment terminal 7-2 senses the presence of the electronic money card 100 after the asynchronous payment terminal 7 senses the presence of the electronic money card 100 (step 320).

Then, when sensing the presence of the electronic money card 100, before performing communication with the electronic money card 100, the asynchronous payment terminal 7-2 determines whether or not the microphone 146 detects the ultrasound (step 340).

In this case 1, since the asynchronous payment terminal 7 emits ultrasound, the microphone 146 detects the ultrasound (step 340; Y). Here, the asynchronous payment terminal 7-2 performs communication with the electronic money card 100 and holds processing such as confirmation of balance or writing (step 350).

Then, it is determined whether or not the microphone 146 stops detecting the ultrasound (step 380). In this case, since the asynchronous payment terminal 7 stops emission of the ultrasound (step 370), the microphone 146 of the asynchronous payment terminal 7-2 stops detecting the ultrasound (step 380; Y).

When this microphone 146 stops detecting the ultrasound, the asynchronous payment terminal 7-2 performs communication with the electronic money card 100 and performs processing such as confirmation of balance or writing (step 390). Incidentally, if the ultrasound is not detected in step 340 (step 340; N), the asynchronous payment terminal 7-2 also performs communication with the electronic money card 100 and performs processing such as confirmation of balance or writing.

Next, case 2 (a case where the electronic money card 100 first moves closer to the asynchronous payment terminal 7-2) depicted in FIG. 17 will be described with reference to the flowchart of FIG. 20.

First, the asynchronous payment terminal 7-2 senses the presence of the electronic money card 100 (step 400), before performing communication with the electronic money card 100, the asynchronous payment terminal 7-2 determines whether or not the microphone 146 detects ultrasound (step 410).

In this case 2, since the asynchronous payment terminal 7-2 first senses the presence of the electronic money card 100, the microphone 146 does not detect the ultrasound (step 410;

Then, the asynchronous payment terminal 7-2 performs communication with the electronic money card 100 and starts processing such as confirmation of balance or writing (step 420). Then, at the same time, it is determined whether or not the microphone 146 detects the ultrasound (step 460).

On the other hand, the asynchronous payment terminal 7 senses the presence of the electronic money card 100 after the asynchronous payment terminal 7-2 senses the presence of the electronic money card 100 (step 430). Then, the asynchronous payment terminal 7 starts emission of ultrasound from the speaker 145 (step 440).

Then, the asynchronous payment terminal 7 performs communication with the electronic money card 100 and performs processing such as confirmation of balance or writing (step 450).

At that time, the asynchronous payment terminal 7-2 detects the ultrasound whose emission has been started in step 440 (step 460; Y). Here, the asynchronous payment terminal 7-2 suspends the processing such as confirmation of balance or writing which is being performed (step 470). Moreover, in some cases, the processing is abandoned.

Then, the asynchronous payment terminal 7 performs communication with the electronic money card 100, and, when the processing such as confirmation of balance or writing is completed (step 480; Y), the asynchronous payment terminal 7 stops emission of the ultrasound from the speaker 145 (step 490).

Then, when the microphone 146 stops detecting the ultrasound (step 500; Y), the asynchronous payment terminal 7-2 resumes the processing (step 510).

Incidentally, if the microphone 146 detects the ultrasound in step 410, the asynchronous payment terminal 7-2 holds the processing (step 415), and, when the microphone 146 stops detecting the ultrasound (step 500; Y), the asynchronous payment terminal 7-2 performs the processing (step 510).

According to the fifth embodiment, even in a situation in which the asynchronous payment terminal 7 and the asynchronous payment terminal 7-2 are installed in proximity to each other in a real existing store, it is possible to resolve an access conflict between them appropriately.

In other words, it is possible to dispose the asynchronous payment terminal 7 and the asynchronous payment terminal 7-2 side by side while preventing an access conflict and increase flexibility in disposing the asynchronous payment terminals.

It can be said that the asynchronous payment terminal 7-2 of the fifth embodiment includes a sensing unit that senses the access status to a storage device (the electronic money card 100) from the other information access device (the asynchronous payment terminal 7).

EXPLANATIONS OF LETTERS OR NUMERALS 1 electronic money system
2 electronic money server
3 the Internet
5 portable terminal
6 payment terminal
7 asynchronous payment terminal
7-2 asynchronous payment terminal
8 communication line
11 CPU
12 ROM
13 RAM
14 input section
15 output section
16 communication controlling section
17 short-distance communication controlling section
18 storing section
19 bus line
20 microphone
21 acceleration sensor
23 GPS receiver
26 information processing section
27 storing section
28 electromagnetic wave sensing section
29 electronic money application
30 IC module
31 CPU
32 ROM
33 RAM
34 communication controlling section
35 storing section
36 bus line
100 electronic money card
145 speaker
300 credit company server

The invention claimed is:
1. An information processing system comprising:
a portable terminal comprising a storage device storing a balance value of electronic money for the portable terminal;

a payment terminal configured to:
   access the balance value stored in the storage device to perform a payment process with the portable terminal;
   continuously generate waves having predetermined patterns, each of the predetermined patterns indicating a priority of the payment terminal to access the storage device included in the portable terminal; and
   output the generated waves; and
an electronic money application installed in the portable terminal, and configured to:
   turn on a microphone of the portable terminal;
   determine whether the turned-on microphone detects a first pattern of the waves output by the payment terminal;
   based on the turned-on microphone being determined to detect the first pattern of the waves output by the payment terminal, compare a first priority of the payment terminal currently accessing the storage device included in the portable terminal, the first priority being indicated by the detected first pattern, to a second priority of the electronic money application to access the storage device;
   based on the first priority of the payment terminal being compared to be higher than the second priority of the electronic money application, turn off the microphone and refrain the electronic money application from accessing the balance value stored in the storage device; and
   based on the first priority of the payment terminal being compared to not be higher than the second priority of the electronic money application, allow the electronic money application to access the balance value stored in the storage device.

2. The information processing system according to claim 1, wherein the storage device is included in an integrated chip (IC) module, and is further configured to change the balance value stored in the storage device, using balance change information that is received during an access of the storage device by an external device,
the payment terminal is further configured to transmit the balance change information to the IC module, and
the electronic money application is further configured to transfer the balance change information that is received from an electronic money server, to the IC module.

3. The information processing system according to claim 1, wherein the first priority of the payment terminal and the second priority of the electronic money application are set such that a higher priority is given to processing with a shorter time for access to the storage device.

4. The information processing system according to claim 1, wherein the first priority of the payment terminal and the second priority of the electronic money application are set such that a highest priority is given to an access terminal that is installed in connection with a pass gate.

5. The information processing system according to claim 2, wherein the electronic money application is further configured to:
   detect the output ultrasonic waves in a period between a reception of the balance change information from the electronic money server and a transfer of the balance change information to the IC module; and
   based on the output ultrasonic waves being detected in the period, refrain the electronic money application from transferring the balance change information.

6. The information processing system according to claim 2, wherein the IC module is further configured to output a signal indicating that the IC module is in a state in which the storage device is being accessed from the external device, and
the electronic money application is further configured to postpone the electronic money application from accessing the storage device, based on receiving the signal output by the IC module.

7. The information processing system according to claim 1, wherein the electronic money application is turned on before access to the storage device starts.

8. The information processing system according to claim 1, wherein the electronic money application is turned off after a need for refraining the electronic money application from accessing the storage device is eliminated.

9. The information processing system according to claim 1, wherein
the payment terminal comprises a first speaker configured to output the generated ultrasonic waves, and
the portable terminal comprises a second speaker.

10. The information processing system according to claim 1, wherein, when the first priority level of the payment terminal is higher than the second priority level of the electronic money application, a first amount of time required for the payment terminal to access the information processing system is less than a second amount of time required for the electronic money application to access the information processing system.

11. The information processing system according to claim 1, wherein the waves comprise sound waves.

12. The information processing system according to claim 11, wherein the sound waves comprise ultrasonic waves.

13. The information processing system according to claim 1, wherein the waves comprise electromagnetic waves.

* * * * *